United States Patent
Dardanis et al.

(10) Patent No.: US 8,133,337 B2
(45) Date of Patent: Mar. 13, 2012

(54) METHOD FOR MAKING A CONCRETE BLOCK

(75) Inventors: Brandon J. Dardanis, Steamboat Springs, CO (US); Jess A. Dardanis, Golden, CO (US); Kenneth M. Switzer, Frederick, MD (US); James A. Peeders, Albuquerque, NM (US)

(73) Assignee: Pacific Coast Building Products, Inc., Rancho Cordova, CA (US)

( * ) Notice: Subject to any disclaimer, the term of this patent is extended or adjusted under 35 U.S.C. 154(b) by 231 days.

(21) Appl. No.: 12/650,812

(22) Filed: Dec. 31, 2009

(65) Prior Publication Data

US 2011/0155308 A1  Jun. 30, 2011

(51) Int. Cl.
*E04F 13/077* (2006.01)
*B32B 37/02* (2006.01)
*B32B 37/12* (2006.01)
*B32B 37/18* (2006.01)
*B32B 38/10* (2006.01)
*B29C 65/52* (2006.01)
*E04C 2/04* (2006.01)

(52) U.S. Cl. .......... 156/71; 156/182; 156/242; 156/257; 156/307.3; 156/307.7; 52/422; 52/439; 52/596; 52/605; 52/607

(58) Field of Classification Search .......... 156/71, 156/182, 242, 250, 256, 257, 307.1, 307.3, 156/307.7; 52/422, 437, 439, 596, 605–612
See application file for complete search history.

(56) References Cited

U.S. PATENT DOCUMENTS

| | | | |
|---|---|---|---|
| 2,701,959 A | 2/1955 | Briggs | |
| 3,694,128 A * | 9/1972 | Foxen | 425/412 |
| 4,295,313 A | 10/1981 | Rassias | |
| 4,319,440 A | 3/1982 | Rassias | |
| 4,844,964 A * | 7/1989 | Jurrus | 428/74 |
| 6,397,549 B1 * | 6/2002 | Baldwin | 52/596 |
| 2010/0068533 A1 * | 3/2010 | Chanvillard | 428/428 |

OTHER PUBLICATIONS

Master Builders; Polyheed 997, (Mar. 2007).*

* cited by examiner

*Primary Examiner* — Sing P Chan
(74) *Attorney, Agent, or Firm* — Martin & Associates, LLC; Derek P. Martin

(57) ABSTRACT

A mold core with a plurality of tension springs is placed in a mold box such that the top of the mold core is even with the top of the mold box when the plurality of tension springs have no tension. Block mix including a substantial amount of compressible material is poured into the mold and lightly vibrated. A movable bottom plate then moves downward at the same time as the mold core is moved downward a first distance to stretch the plurality of tension springs. After the mold core is moved downward the first distance, the movement of the mold core stops while the movement of the movable plate continues downward, thereby ejecting the partial block element from the mold. Block elements are cured, then glued together to form a complete block. One or both of the exterior surfaces of the block may have a wooden attachment layer attached.

20 Claims, 18 Drawing Sheets

METHOD FOR MAKING A CONCRETE BLOCK

BACKGROUND

1. Technical Field

The disclosure and claims generally relate to construction materials and techniques, and more specifically relate to a method for making a concrete block.

2. Background Art

Building blocks have been used for centuries to construct homes, office buildings, churches, and many other structures. Early building blocks were hewn from stone into appropriate shapes that were assembled together, typically using mortar, to form a wall. In modern times, various types of concrete blocks were developed, which are typically formed by pouring a cement mixture into a mold and allowing the cement to harden. This type of cement block is strong and makes for a sturdy wall, but installing a traditional concrete block requires a skilled mason that places mortar in all joints between blocks to secure the blocks in place.

Various different block configurations have been developed that allow mortar to be poured into inner passageways of the blocks once the blocks have been constructed into a wall. Some of these eliminate the need for a mason to apply mortar between the blocks as the blocks are laid because the blocks are interlocked using mortar poured into interior passages. Examples of blocks with inner passages are found in U.S. Pat. No. 4,295,313, "Building Blocks, Wall Structures Made Therefrom, and Methods of Making the Same", issued Oct. 20, 1981 to Rassias; U.S. Pat. No. 4,319,440, "Building Blocks, Wall Structures Made Therefrom, and Methods of Making the Same", issued Mar. 16, 1982 to Rassias; U.S. Pat. No. 2,701,959, "Sectional Block Masonry", issued Feb. 15, 1955 to Briggs; and Swiss Patent No. 354237, issued Jun. 30, 1961.

One significant drawback of using concrete blocks to form walls in a structure is that surficial covering material often needs to be applied to the surface of the walls. Many common surficial coverings for walls are attached using nails or screws. For example, siding may need to be applied to the outside of the wall, and wallboard, paneling, or other sheet material may need to be applied to the inside of the wall. Known concrete blocks are too hard and brittle to allow commonly-used nails or screws to be used to attach a surficial covering material. As a result, special concrete nails or anchors are typically used to secure wood furring strips or studs to the concrete block wall, and the covering materials are, in turn, fastened to the furring strips or studs. This process of fastening wood furring strips or studs to the block wall and nailing on the covering material to the furring strips is time-consuming, and the concrete blocks do not hold the nails or anchors in place very well. It is not uncommon for one or more of the concrete nails to become loose when a surficial material is nailed in place, compromising the structural integrity of the wall.

Therefore, there existed a need to provide an improved building block with an attachment layer that allows covering materials to be directly attached to the building blocks using conventional nails, screws, or staples. Such a building block is disclosed in U.S. Pat. Nos. 6,085,480 and 6,397,549, which have been assigned to TechBlock International, LLC, the assignee of the instant application. One of the problems in making the building blocks in the two patents referenced above is the use of customized equipment to form the blocks, which is expensive. There are many manufacturing facilities around the world that make many different kinds of known concrete blocks, known in the industry as Concrete Masonry Units (CMUs). It would be desirable to manufacture the block in the two patents cited above using standard machines that manufacture CMUs. However, because the patented block has dimensions that are typically much larger than a CMU, it would be difficult to fabricate a whole block on these known CMU machines without significant modifications.

In addition, fabricating a concrete block that has a substantial amount of compressible material (such as polystyrene) is not suited to existing machines and methods for making CMUs. Existing CMU machines typically use a mold that receives the mix and a head shoe assembly that presses down on the mix, thereby providing substantial compressive force that results in compaction of the block mix. This process is described in the Background of the Invention section of U.S. Pat. No. 7,261,548 issued on Aug. 28, 2007 to John T. Ness. The head shoe assembly compresses the concrete in the mold while simultaneously vibrating the mold, resulting in substantial compression and optimal distribution of the concrete throughout the mold cavity. Because of the compression, the concrete reaches a level of hardness that permits immediate stripping of the finished block from the mold. This is typically done by moving a movable plate that forms the bottom of the mold downward while at the same time moving the head shoe assembly downward, resulting in the head shoe assembly ejecting the block from the mold.

A block mix that includes a substantial amount of compressible material (such as polystyrene) cannot be used in a traditional CMU mold and process, because the compressible material in the mix makes the mix "springy", meaning the mix can compress as a result of the compression of the compressible material, but when the compressing force is removed, the compressible material tends to uncompress to its original shape. So if such a mix were put into a traditional CMU mold, the compressing step would compress the mix, but when the movable plate moves downward to eject the block from the mold, the force of the compressible material expanding due to removing the compressive force would typically cause the block to blow apart or fall apart and not hold its shape. As a result, new manufacturing methods are needed to mold blocks that include a substantial amount of compressible material on traditional CMU machines.

BRIEF SUMMARY

A building block may be formed on known CMU molding machines with some modifications that allow economical and high-speed production of the block. A mold core with a plurality of tension springs is placed in a mold box such that the top of the core is even with the top of the mold box when the plurality of tension springs have no tension. The mold box and mold core define a shape of a partial block element. Block mix including a substantial amount of compressible material is poured into the mold and lightly vibrated. A movable bottom plate then moves downward at the same time as the mold core is moved downward a first distance to tension the plurality of tension springs, while the mold box stays in place. After the mold core is moved downward the first distance, the movement of the mold core stops while the movement of the movable plate continues downward, thereby ejecting the partial block element from the mold.

Block elements may optionally be trimmed to desired dimensions. Block elements are cured, then glued together to form a complete block. One or both of the exterior surfaces of the block may have a wooden attachment layer attached to simplify attachment of sheet or other material to the blocks once installed into a wall.

The foregoing and other features and advantages will be apparent from the following more particular description, as illustrated in the accompanying drawings.

BRIEF DESCRIPTION OF DRAWINGS

This disclosure is described in conjunction with the appended drawings, where like designations denote like elements, and.

DETAILED DESCRIPTION

Figure 1:
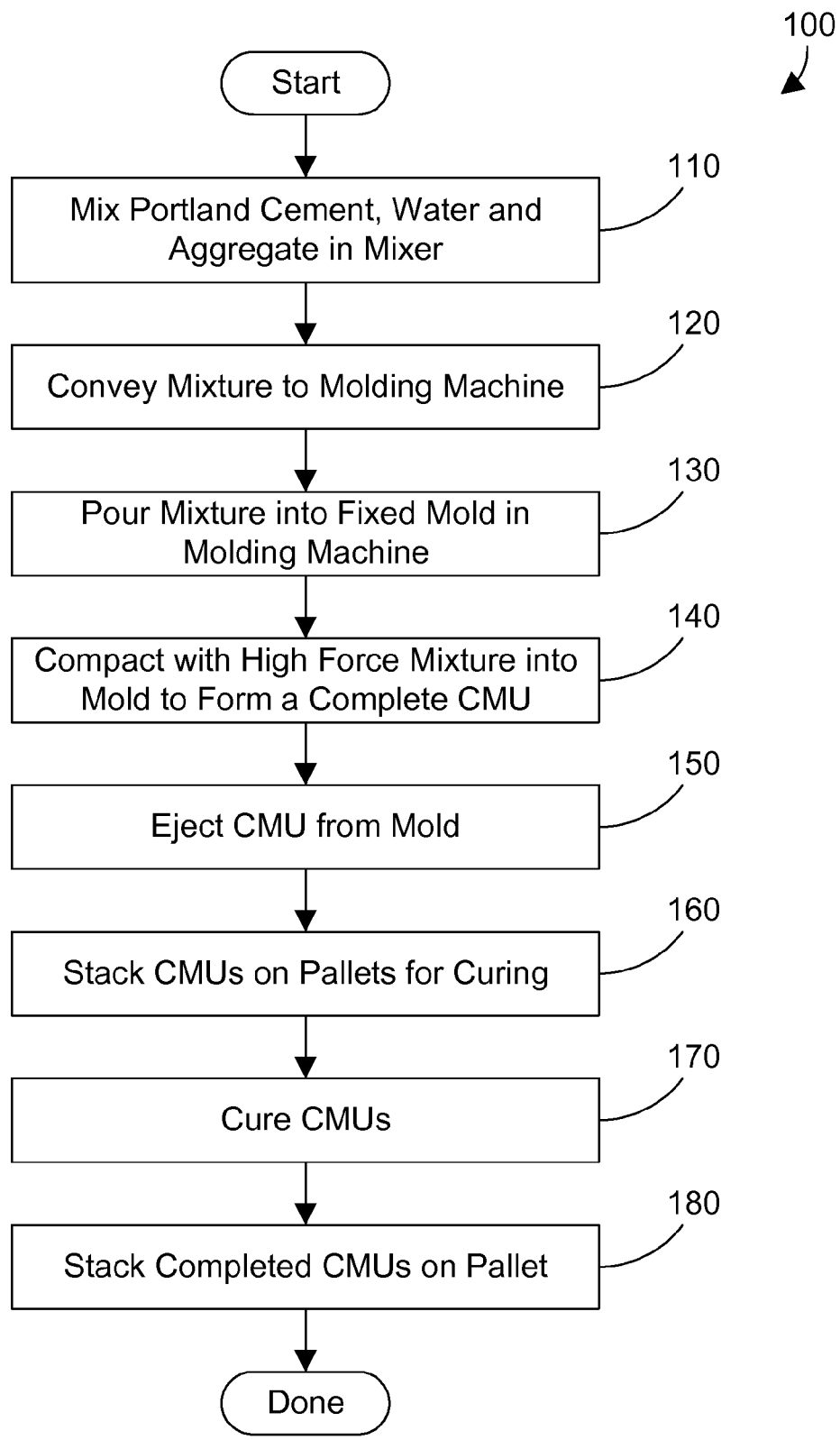
FIG. 1 is a flow diagram of a prior art method for making a known concrete masonry unit (CMU)

Referring to FIG. 1, a prior art method for making concrete building blocks, also know in the art as concrete masonry units (CMUs), is shown as method 100 in FIG. 1. Note that method 100 has been simplified for the purpose of illustration, with many details being intentionally omitted. First, Portland cement, water and aggregate is mixed in a mixer (step 110). The specific proportions and the specific aggregate or aggregates used depends on the desired attributes of the CMU being made. One suitable prior art mixture for lightweight CMUs is disclosed in U.S. Pat. No. 6,311,444 issued on Nov. 6, 2001 to John F. Sipe. The mixture is then conveyed to a molding machine (step 120). The mixture can be conveyed in any suitable way, including a belt conveyor, a pump, a front-end loader, wheelbarrow and shovel, or any other suitable material handler. The mixture is then poured into a fixed mold in the molding machine (step 130). The specifics of the prior art molding process are described below in detail with reference to FIGS. 25-29. The mixture in the mold is then compressed with high force to form a complete CMU (step 140). The CMU is then ejected from the mold (step 150). CMUs are then stacked on pallets for curing (step 160). The CMUs are cured (step 170). The completed CMUs are then stacked on pallets for shipping (step 180).

The prior art process 100 for making a traditional CMU on a traditional CMU molding machine is not suitable for making a concrete block that includes a substantial amount of compressible material, such as polystyrene. The presence of the compressible material will cause the block mix to compress a significant amount in step 140, which means the compressible material will be compressed and will tend to uncompress as soon as it is ejected from the mold, causing the block to blow apart or fall apart and not hold its shape. In addition, the presence of a substantial amount of compressible material such as polystyrene makes the block mix substantially lighter than traditional concrete block mix, which allows the size of the block to go up significantly. Thus, a traditional concrete block that is 8 in. (20.3 cm) high by 8 in. (20.3 cm) wide by 16 in. (40.6 cm) long typically weighs from 40-60 lbs (18.1-27.2 kg). The Sipe patent referenced above uses a lightweight mix that reduces the weight of a CMU of the same dimension to 30-45 lbs (13.6-20.4 kg).

By adding lightweight compressive material, such as expanded polystyrene (EPS) foam beads, the size of a block can be increased significantly while still keeping the block in a weight range that can be handled by one person. However, making a larger block typically makes the block too large to be fabricated on many existing CMU molding machines. Buying or building customized machinery for forming larger blocks that have a substantial amount of compressible material is an expensive solution. It would be desirable to find a way to make larger blocks using known CMU molding machines, because they are relatively inexpensive and are found all over the world. The disclosure and claims herein are directed to making partial block elements that includes a substantial amount of compressible material on a standard CMU molding machine using little to no compression and a spring-loaded mold, which partial block elements can be later assembled into a large, completed block.

Figure 2:
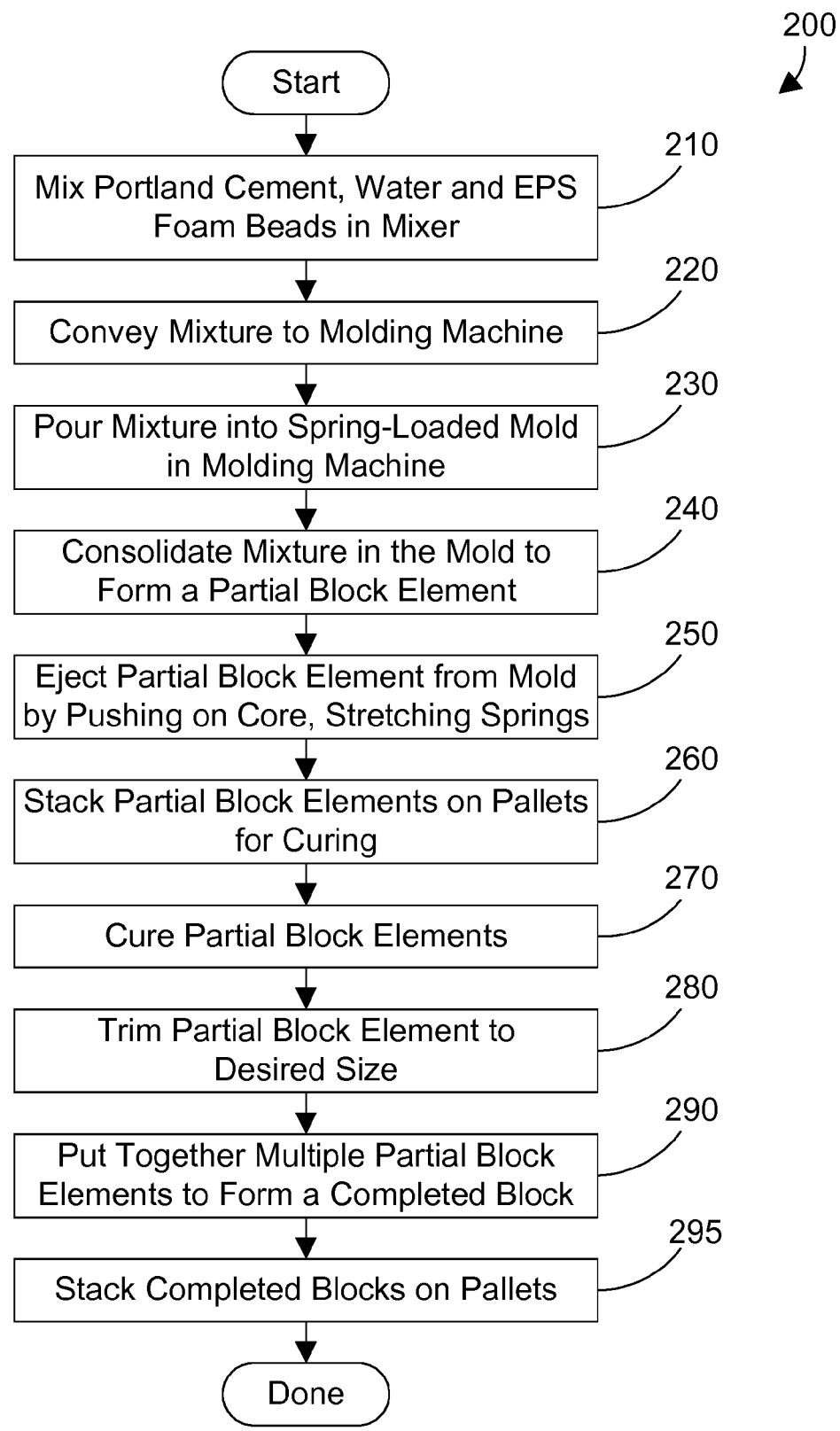
FIG. 2 is a flow diagram of a method for making a concrete block that includes a substantial amount of compressible material.

Referring to FIG. 2, first Portland cement, water, and EPS foam beads are mixed in a mixer (step 210). Next, the mixture is conveyed to a molding machine (step 220). As in prior art step 120 in FIG. 1, the conveying of the mixture may be done in any suitable way, including a belt conveyor, a pump, a front-end loader, wheelbarrow and shovel, or any other suitable material handler. The mixture is then poured into a spring-loaded mold in the molding machine (step 230). The spring-loaded mold preferably includes a movable plate that forms the bottom of the mold, a mold box in a fixed position, and a mold core that includes a plurality of tension springs. When the plurality tension springs are not tensioned, the top of the mold core is preferably at the top of the mold box, with a hole in the center of the mold core providing a path for the mixture to enter the mold box. The shape of the mold box with the mold core defines a desired shape of a partial block element. The mixture is then consolidated in the mold to form a partial block element (step 240). The preferred method of consolidation in step 240 is light vibration. However, light compressive force may also be applied in step 240. The head shoe assembly then presses on the mold core, causing the tension springs to expand as the mold core moves downward a first distance as the movable plate moves downward. Once the mold core moves the first distance, travel of the head shoe assembly stops while downward travel of the movable plate continues, resulting in the partial block element being ejected from the mold (step 250). Next, the partial block elements are stacked on pallets for curing (step 260), and are then cured (step 270). The block may then be trimmed to its desired size (step 280). Note that step 280 may be optional if the molding process can reliably produce a block of the desired dimensions. Trimming may be done using any suitable mechanism, including a saw blade, a counter-rotating bar blade, a shear blade, a grinder wheel, etc. In addition, trimming step 280 may be performed before the block elements are cured. Multiple partial block elements are then put together to form a completed block (step 290). The partial block elements are preferably put together using a suitable adhesive. Finally, the completed blocks are stacked on pallets for shipment (step 295).

The proportions of cement, water and EPS foam beads in the block mix may vary according to the desired characteristics of the partial block elements being made. In addition, the block mix may include various additives that improve the characteristics of the partial block elements. In the most preferred implementation, 17-20 gallons (64.4-75.7 liters) of water is mixed with 35-40 cu. ft. (0.99-1.1 cu. meters) EPS foam beads and 310-330 lbs (141-150 kg) cement. In addition, the most preferred block mix includes 8-24 fluid oz. (0.24-0.71 liters) acrylic fortifier and 16-20 fluid oz. (0.47-0.59 liters) water reducer. One suitable acrylic fortifier is Quikrete Concrete Acrylic Fortifier. One suitable water reducer is Polyheed 900 manufactured by BASF. The resulting batch of block mix can yield approximately 70-75 of the quarter-block elements shown in FIGS. 10-12. Note the proportions of ingredients in the block mix may be adjusted according to specific needs. For example, when making blocks in a very dry climate, additional water may be added to keep the block mix from drying out before the molding step. If the conveyor length between the mixer and molding machine is long, more water may be needed to keep the block mix from drying out while being conveyed to the molding machine. Suitable ranges for the ingredients in the block mix are from 10-28 gallons (37.9-106 liters) water, 25-50 cu ft. (0.71-1.4 cubic meters) EPS foam beads, and 280-360 lb. (127-163 kg) cement.

Other things may also be added to the block mix within the scope of the disclosure and claims herein. For example, a plasticizer such as Rheomix 600 ES could be used. For the most preferred batch size disclosed in the preceding paragraph, up to 5 cups (1.2 l) could be added. In addition, natural or synthetic fibers could also be added to the mix. The disclosure and claims herein expressly extend to the addition of any suitable admixture into the block mix, whether currently known or developed in the future.

Large blocks may be formed using traditional CMU molding machines by molding partial block elements, then attaching the partial block elements to form a completed block. For example, referring to FIG. 3, a method 290A is a first suitable implementation for step 290 in FIG. 2. Method 290A creates a completed block with no wooden attachment layers from four quarter-blocks. First, two quarter-blocks are glued together side-by-side (step 310). Next, two more quarter-blocks are glued atop the two that were previously glued in the last step, and are also glue to each other (step 320). The result is a completed block with no wooden attachment layers (step 330). Blocks with no wooden attachment layers are especially useful below-grade.

Figure 4:
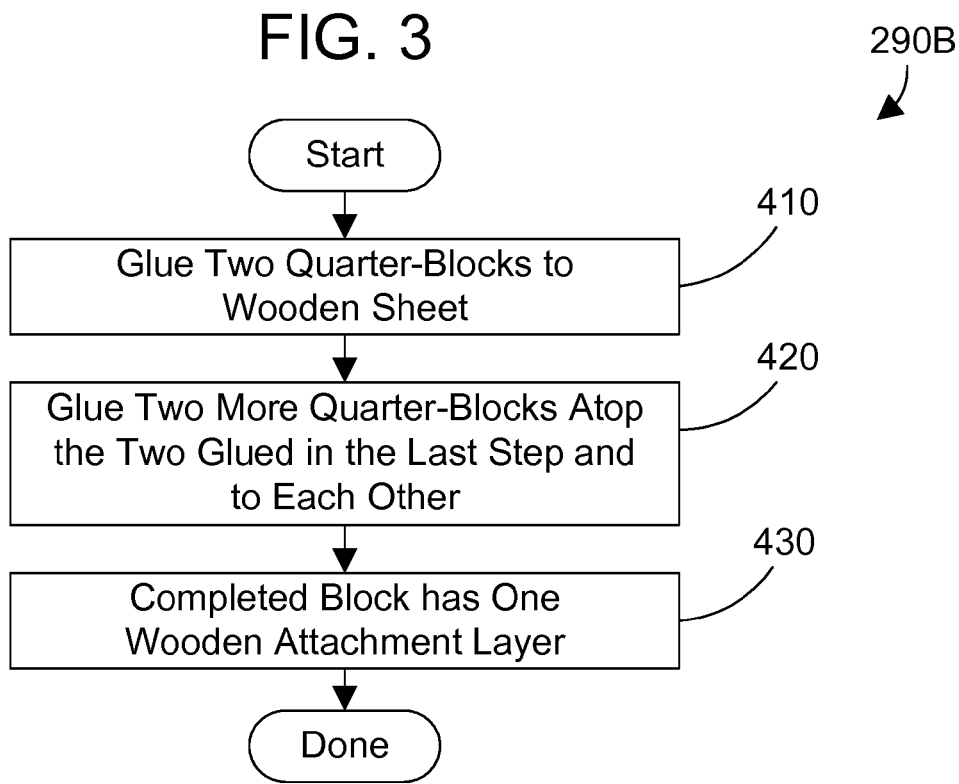
FIG. 4 is a flow diagram of a second exemplary method for performing step 270 in FIG. 2 to produce a block with one wooden attachment layer using four quarter-block elements.

Referring to FIG. 4, a method 290B is a second suitable implementation for step 290 in FIG. 2. Method 290B creates a completed block with one wooden attachment layers from four quarter-blocks and one wooden sheet. First, two quarter-blocks are glued to a wooden sheet (step 410). Next, two more quarter-blocks are glued atop the two that were previously glued in the last step, and are also glue to each other (step 420). The result is a completed block with one wooden attachment layer (step 430).

Figure 5:
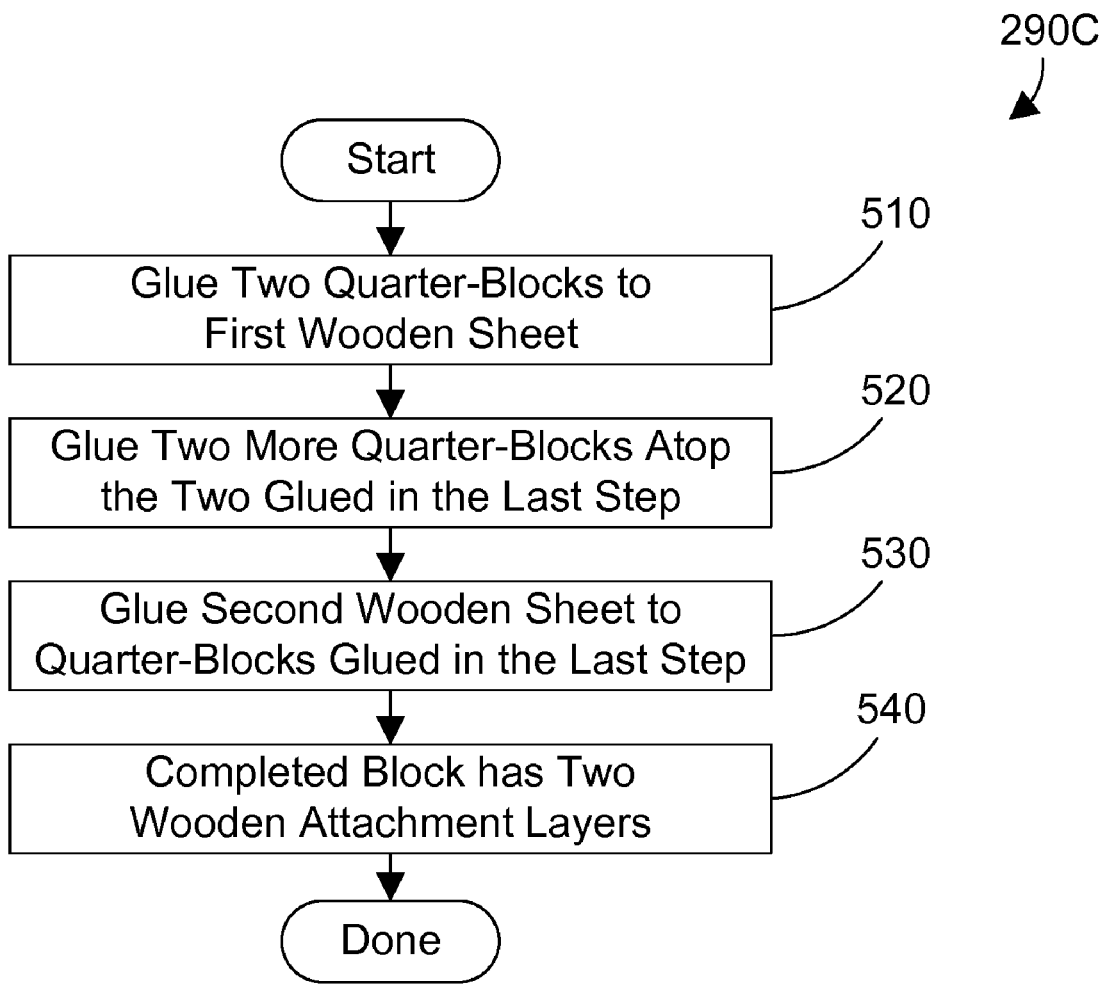
FIG. 5 is a flow diagram of a third exemplary method for performing step 270 in FIG. 2 to produce a block with two wooden attachment layers using four quarter-block elements.

Referring to FIG. 5, a method 290C is a second suitable implementation for step 290 in FIG. 2. Method 290C creates a completed block with two wooden attachment layers from four quarter-blocks and two wooden sheets. First, two quarter-blocks are glued to a first wooden sheet (step 510). Next, two more quarter-blocks are glued atop the two that were previously glued in the last step (step 520). A second wooden sheet is then glued to the two quarter-blocks that were glued in the previous step (step 530). The result is a completed block with two wooden attachment layers (step 540).

Figure 3:
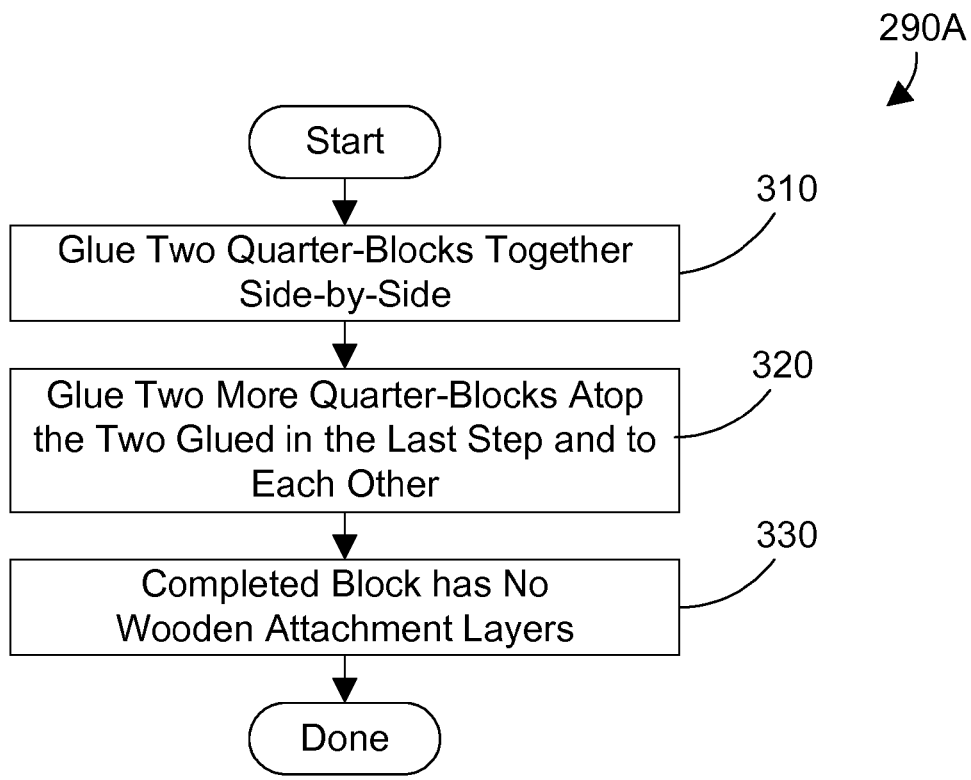
FIG. 3 is a flow diagram of a first exemplary method for performing step 270 in FIG. 2 to produce a block with no wooden attachment layers using four quarter-block elements.

The block assembly in step 290 of FIG. 2 and in methods 290A in FIG. 3, 290B in FIG. 4, and 290C in FIG. 5 can use either stationary glue stations or an inline gluing process. When a stationary glue station is used, a fixture allows easily aligning the parts for gluing, and provides needed pressure while the glue hardens. When an inline gluing process is used, the components to be glued pass under heads the distribute the glue on a partial block element or wooden sheet, and a person or robot can then stack the next partial block element or wooden sheet in place as the block continues down a conveyor belt. The disclosure and claims herein expressly extend to any suitable way to glue together multiple block elements to form a completed block.

Figure 6:
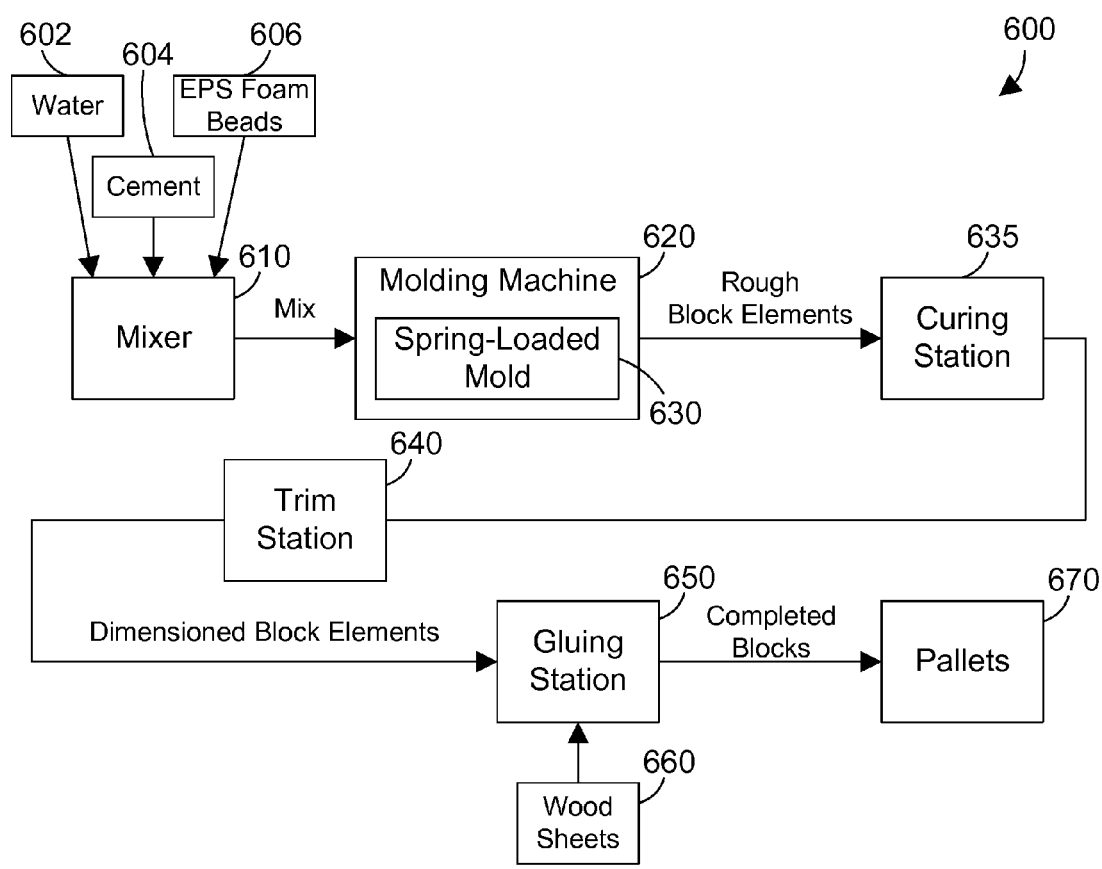
FIG. 6 is an overview schematic diagram of the method shown in FIG. 2.

FIG. 6 is a schematic diagram that illustrates method 200 shown in FIG. 2. First, water 602, cement 604, and EPS foam beads 606 are mixed in mixer 610 (step 210 in FIG. 2). Next, the mix is conveyed to a molding machine 620 (step 220 in FIG. 2). The molding machine 620 includes a spring-loaded mold 630. The output of the molding machine is preferably rough block elements, which then proceed to a curing station 635. The curing station allows the block elements to cure by providing an appropriate environment of temperature and humidity. The cured partial block elements then proceed to a trim station 640, where the partial block elements are trimmed to their final desired dimensions to produce dimensioned block elements. Note that trim station 640 may trim one surface of the partial block element, or may trim multiple surfaces depending on the application. Note that trim station 640 may be eliminated if the block elements coming out of the molding machine 620 have correct and consistent dimensions. In addition, the trim station 640 could be placed before the curing station 635. The dimensioned block elements proceed to a gluing station 650, where multiple partial block elements are glued together to form complete blocks. When one or both faces of the completed block need a wooden attachment layer, one or more wood sheets 660 are glued to the partial block elements. The result is a completed block with one or two wooden attachment layers. The completed blocks are then stacked on pallets 670 for shipment.

Figure 7:
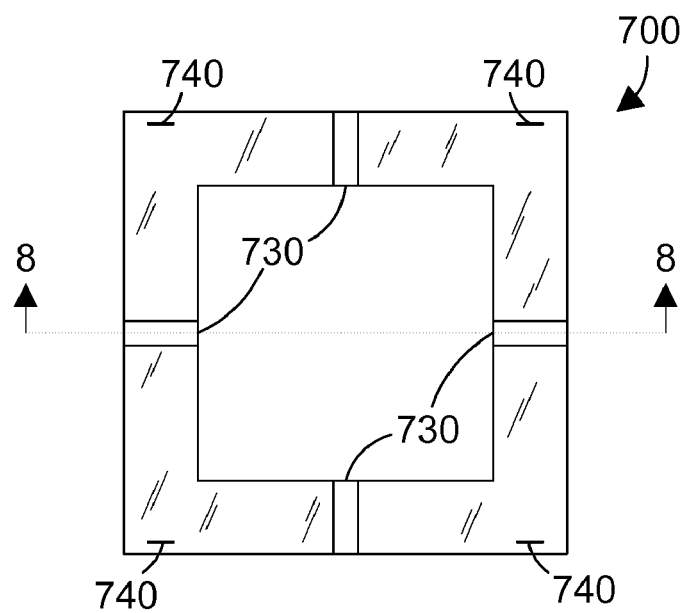
FIG. 7 is a top view of a quarter-block mold core.
Figure 8:
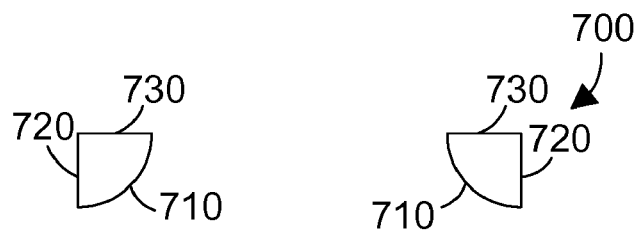
FIG. 8 is a partial cross-sectional view of the quarter-block mold core shown in FIG. 7 along the line 8-8.
Figure 9:
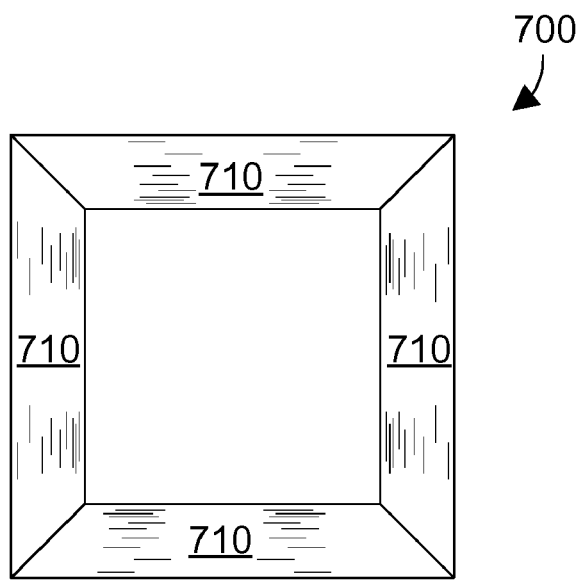
FIG. 9 is bottom view of the quarter-block mold core in FIGS. 7 and 8.

FIGS. 7-9 show one suitable mold core 700 that is used to produce a quarter-block. The mold core 700 includes convex portions 710 coupled to side walls 720. Mold core 700 preferably includes top webs 730 that connect a top edge of each convex portion 710 to the top of the sidewalls 720. Mold core 700 also includes several attachment points 740 for tension springs that are used to suspend the mold core 700 within the mold box, as discussed in more detail below with respect to FIGS. 30-35. Note the view in FIG. 8 is a partial cross-section because only the sides are shown for the sake of clarity.

Figure 10:
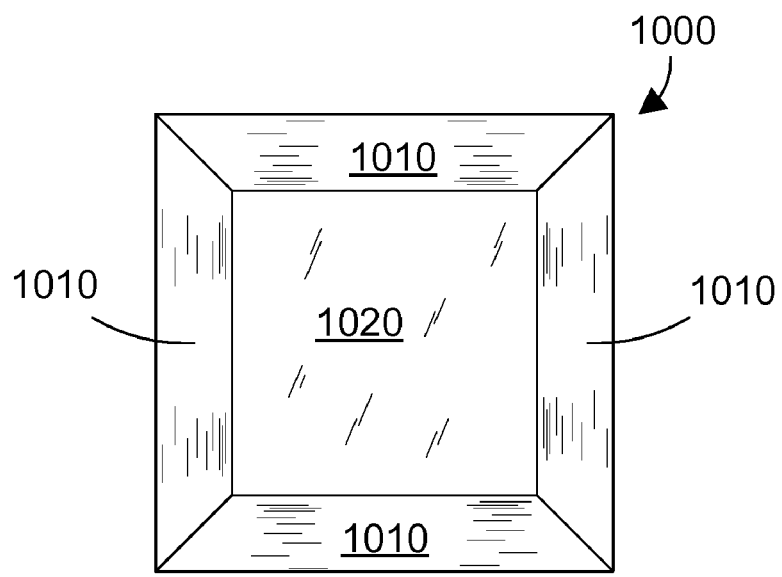
FIG. 10 is a top view of a quarter-block element produced using the quarter-block mold core shown in FIGS. 7-9.
Figure 11:
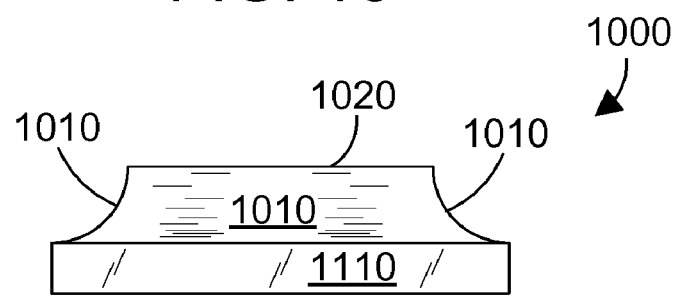
FIG. 11 is a side view of the quarter-block element in FIG. 10.
Figure 12:
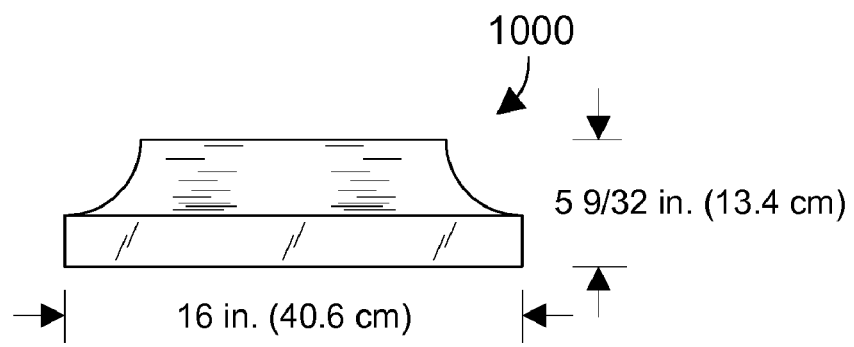
FIG. 12 is a side view of the quarter-block element in FIGS. 10 and 11 showing preferred dimensions.

The mold core 700 in FIGS. 7-9 may be used in conjunction with a mold box and a traditional CMU molding machine to produce quarter-block elements, as shown in FIGS. 10-12. FIG. 10 is a top view of a quarter-block element 1000, while FIG. 11 shows the side view. Block 1000 includes a flat top face 1020 and four sides that each have a concave portion 1010 and a straight portion 1110. FIG. 12 shows preferred dimensions for the quarter-block element to be 16 in. (40.6 cm) wide by 5 9/32 in. (13.4 cm) high. While not shown, the depth of the quarter-block element (into the page in FIG. 12) is also preferably 16 in. (40.6 cm). This means FIG. 12 is an accurate view from two perpendicular sides of the quarter-block element.

Figure 13:
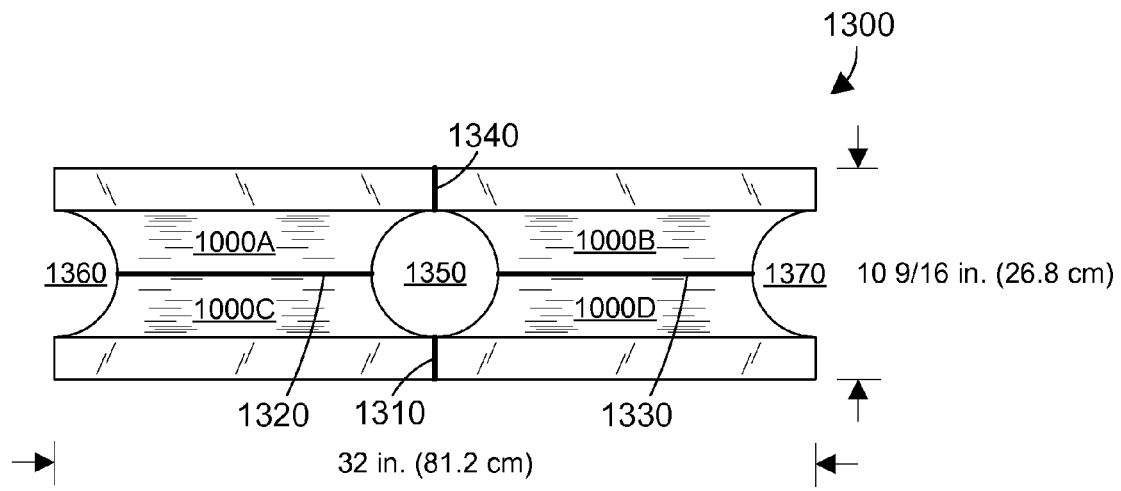
FIG. 13 shows a top view of a completed block formed from four quarter-block elements with no wooden attachment layer.
Figure 14:
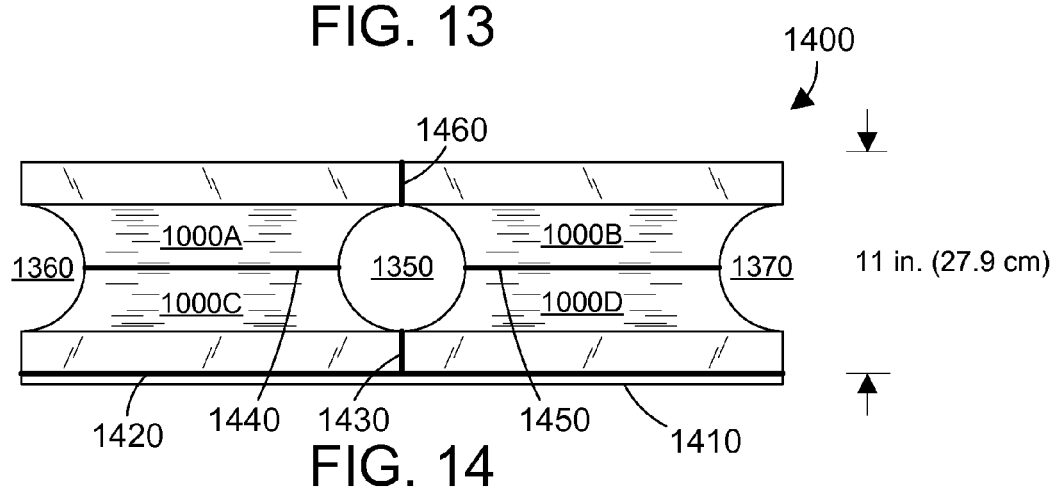
FIG. 14 shows a top view of a completed block formed from four quarter-block elements with one wooden attachment layer.
Figure 15:
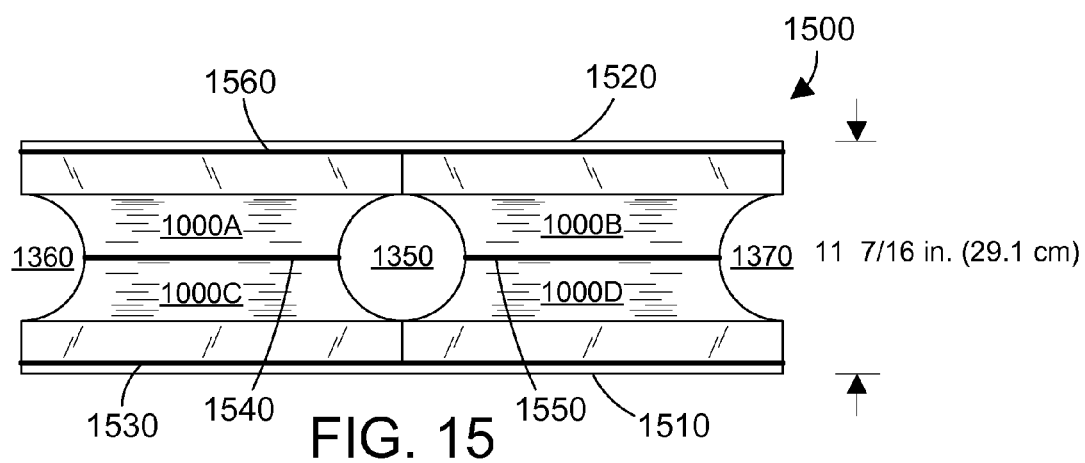
FIG. 15 shows a top view of a completed block formed from four quarter-block elements with two wooden attachment layers.

Four quarter-block elements shown in FIGS. 10-12 may be used to construct a completed block, as shown in FIGS. 13-15. Referring to FIG. 13, to make a first completed block with no wooden attachment layers, two partial block elements (e.g., 1000C and 1000D) are first glued together (step 310 in FIG. 3), as shown by glue joint 1310. Next, two partial block elements 1000A and 1000B may be glued atop the other two block elements 1000C and 1000D previously glued together and to each other (step 320 in FIG. 3), as shown by glue joints 1320, 1330 and 1340. Gluing the four quarter-block elements together results in defining a cylindrical center channel, the circular cross-section of which is visible as 1350 in FIG. 13. In addition, two semi-cylindrical channels are also defined, the semi-circular cross-section of which is visible as 1360 and 1370 in FIGS. 13-15. These semi-cylindrical passages 1360 and 1370 will mate with corresponding semi-cylindrical passages of a neighboring block, thereby defining cylindrical passages at the joint between blocks. With the dimension of the quarter-block shown in FIG. 12, the resulting completed block has the dimensions shown in FIG. 13, namely 10 9/16 in. (26.8 cm) wide, and 32 in. (81.2 cm) in length, with a six in. (15 cm) diameter center cylindrical channel and two six in. (15 cm) diameter side semi-cylindrical channels. Note the height of the completed block will be the same as the side of a quarter-block, namely 16 in. (40.6 cm). Note also the top and bottom of the block each includes a six in. (15 cm) diameter semi-cylindrical channel. The result is a cross-linked lattice of six in. (15 m) diameter cylindrical channels when many blocks are stacked together to form a wall. Rebar is typically placed in the channels, and concrete grout is then poured into the channels. The result in FIG. 13 is a completed block with no wooden attachment layers.

Four quarter-block elements and one wooden sheet may be used to construct a completed block with one wooden attachment layer, as shown in FIG. 14. First, two quarter-blocks 1000C and 1000D are glued to a wooden sheet 1410, as shown by glue joint 1420 (step 410 in FIG. 4). Note the quarter-block elements 1000C and 1000D may also be glued together at glue joint 1430, but glue is not required at this joint because the glue joint 1420 holds the quarter-block elements 1000C and 1000D in place even if they are not glued together at glue joint 1430. Next, two more quarter-block elements 1000A and 1000B are glued atop the two just glued in the last step, and are also glued to each other (step 420 in FIG. 4), as shown by the glue joints 1440, 1450 and 1460. While the height of the block 1400 shown in FIG. 14 is still 16 in. (40.6 cm), and the surface of the block is 32 inches (81.2 cm) (as shown in FIG. 13), the width of the block increased by the thickness of the wooden sheet, which is preferable 7/16 in. (1.1 cm). As a result, the width of block 1400 is preferably 11 in. (27.9 cm). The result is a completed block with one wooden attachment layer.

Four quarter-block elements and two wooden sheets may be used to construct a completed block with two wooden attachment layers, as shown in FIG. 15. First, two quarter-blocks 1000C and 1000D are glued to a first wooden sheet 1510, as shown by glue joint 1530 (step 510 in FIG. 5). Next, two more quarter-block elements 1000A and 1000B are glued atop the two just glued in the last step (step 520 in FIG. 5), as shown by the glue joints 1540 and 1550 in FIG. 15. Next, the second wooden sheet 1520 is glued to the quarter-blocks 1000A and 1000B, as shown by glue joint 1560. While the height of the block 1500 shown in FIG. 15 is still 16 in. (40.6 cm), and the surface of the block is 32 inches (81.2 cm) (as shown in FIG. 13), the width of the block increased by the thickness of two wooden sheets, which are preferably 7/16 in. (1.1 cm) each. As a result, the width of block 1500 is preferably 11 7/16 in. (29.1 cm). The result is a completed block with two wooden attachment layers.

Note the term "wooden attachment layer" broadly encompasses any wooden layer that could be attached to the block using any suitable means of attachment. In the most preferred implementation, the wooden attachment layer is preferably made of oriented strand board (OSB), which provides a low-cost sheet material that may be cut to desired dimensions for use on the blocks. In addition, the wooden attachment layer in the most preferred implementation substantially covers a block surface. In FIGS. 14 and 15, the wooden attachment layers are shown to extend the full width of the blocks. While it is within the scope of the disclosure and claims herein to completely cover each surface with the wooden attachment layer, there are other implementations that do not completely cover each surface that are also within the scope of the disclosure and claims herein. For the purpose of the disclosure and claims herein, a wooden attachment layer substantially covers a block face if at least sixty percent of the block face is covered. In a preferred implementation, the wooden attachment layer preferably covers at least eighty percent of the block face. In the most preferred implementation, the wooden attachment layer preferably covers over ninety-five percent of the block face.

As shown in FIGS. 3-5, the preferred method for attaching the block portions to each other and to any wooden attachment layer(s) is via a suitable adhesive. The preferred polyurethane adhesive is marketed under the brand name Insta-Stik by Dow Chemical Company, which is a polyurethane foam adhesive. Note, however, any suitable adhesive could be used, including a variety of different epoxies, silicone-based glues, etc.

Figure 16:
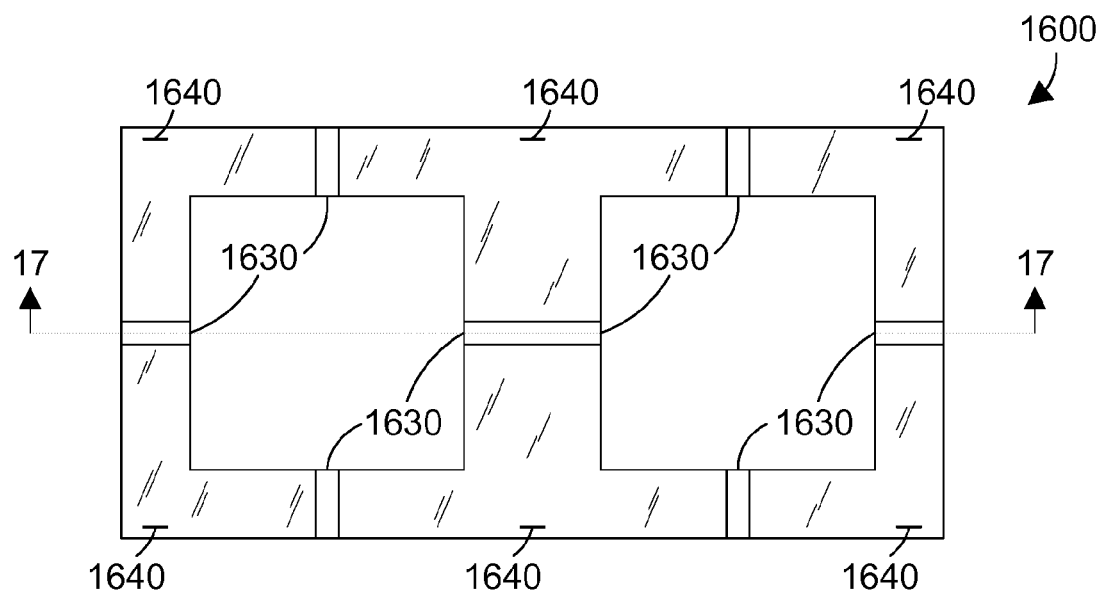
FIG. 16 is a top view of a half-block mold core.
Figure 17:
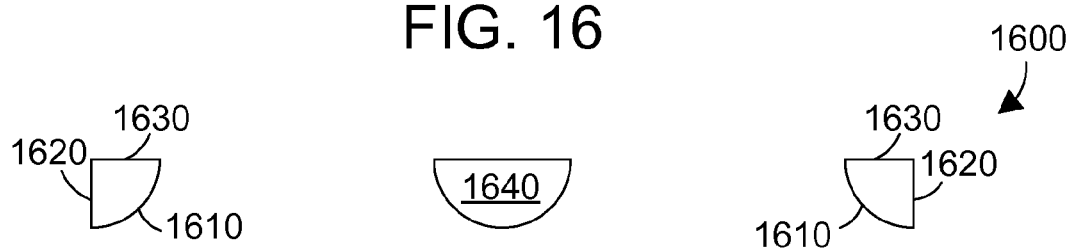
FIG. 17 is a partial cross-sectional view of the half-block mold core shown in FIG. 16 along the line 17-17.
Figure 18:
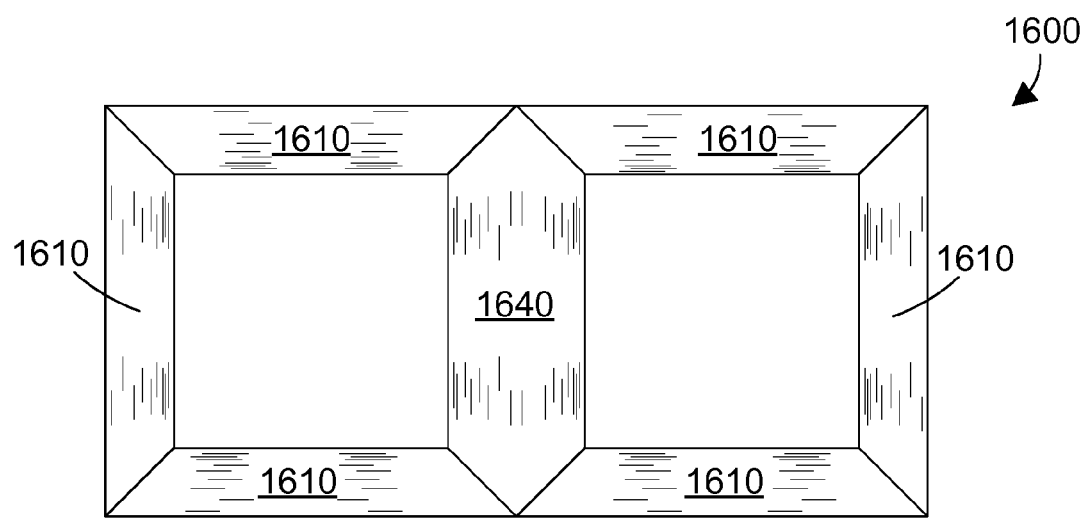
FIG. 18 is bottom view of the half-block mold core in FIGS. 16 and 17.

If the size of the molding machine allows, half-blocks could be molded instead of the quarter-blocks shown in FIGS. 10-15. A suitable mold core 1600 for a half block is shown in FIGS. 16-18. Again, the cross-section in FIG. 17 is a partial cross-section because the end is not shown for the sake of clarity. FIG. 18 shows the bottom portion of the mold core 1600, including the portions 1610 that are quarter-cylindrical and center portion 1640 that is half-cylindrical in shape. The top view in FIG. 16 shows six attachment points 1640 for a plurality of tension springs.

Figure 19:
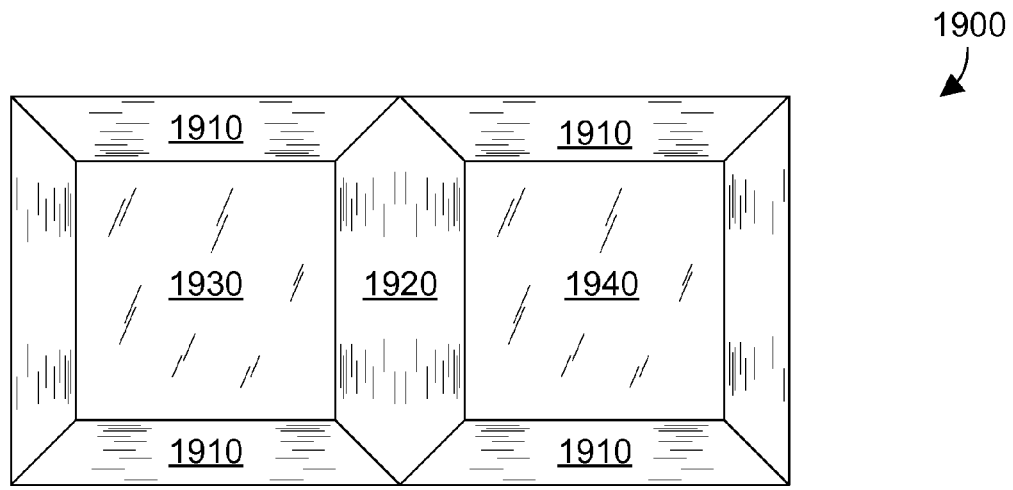
FIG. 19 is a top view of a half-block element produced using the mold core shown in FIGS. 16-18.
Figure 20:
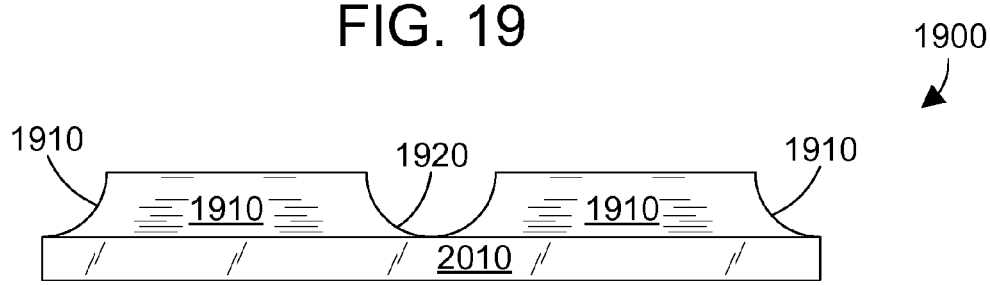
FIG. 20 is a side view of the half-block element in FIG. 19.
Figure 21:
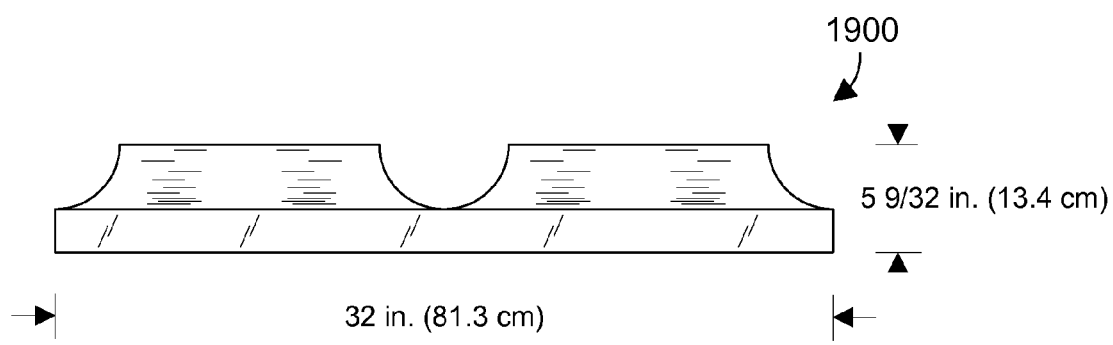
FIG. 21 is a side view of the half-block element in FIGS. 19 and 20 showing preferred dimensions.

Using the half-block mold core 1600 shown in FIGS. 16-18, a half-block can be produced, as shown in FIGS. 19-21. FIG. 19 is a top view of a half-block. FIG. 20 is the side view of the half-block. The side view in FIG. 21 includes preferred dimensions for the half block, which has a length of 32 in. (81.3 cm), a thickness of 5$\frac{9}{32}$ in. (13.4 cm) and a height of 16 in. (40.6 cm) that is not shown in FIG. 21.

Figure 22:
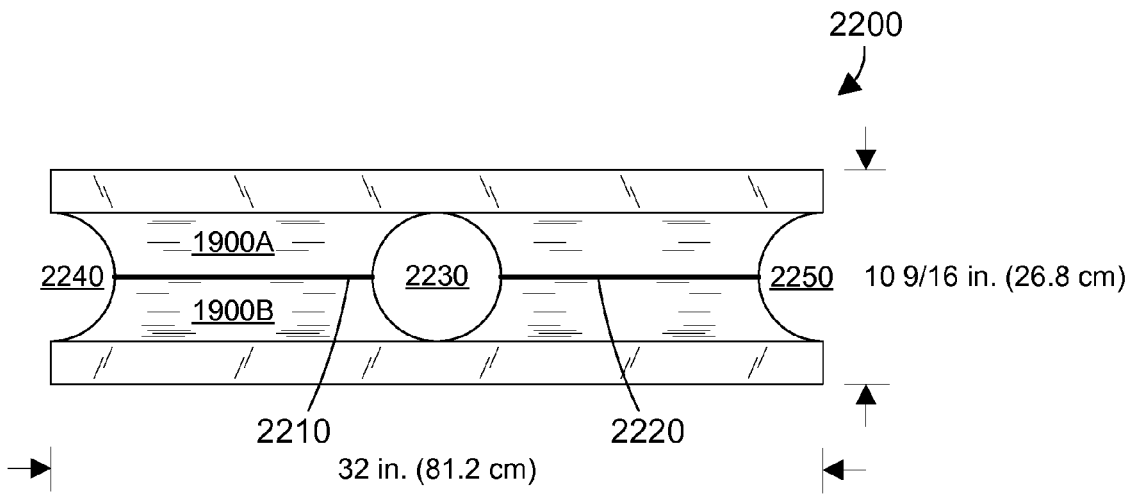
FIG. 22 shows a top view of a completed block formed from two half-block elements with no wooden attachment layer.
Figure 23:
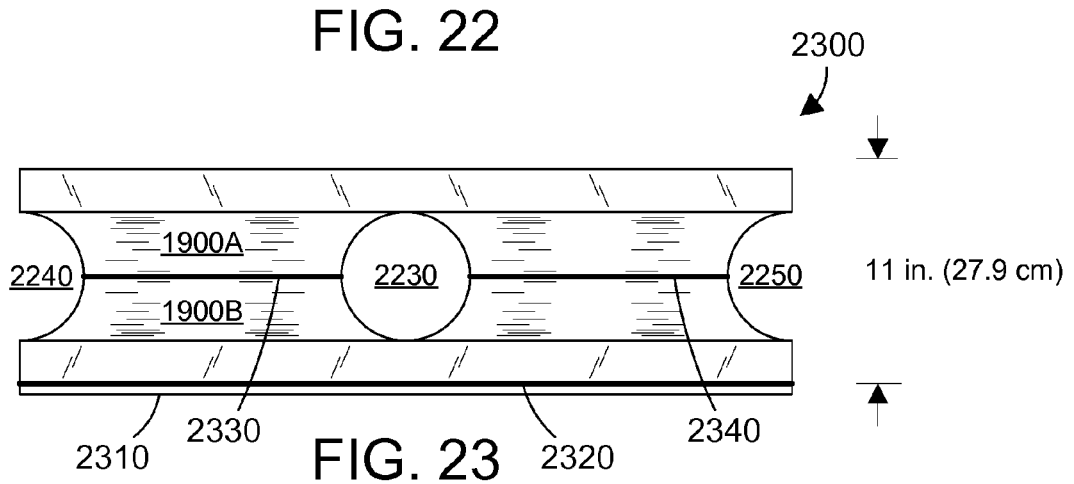
FIG. 23 shows a top view of a completed block formed from two half-block elements with one wooden attachment layer.
Figure 24:
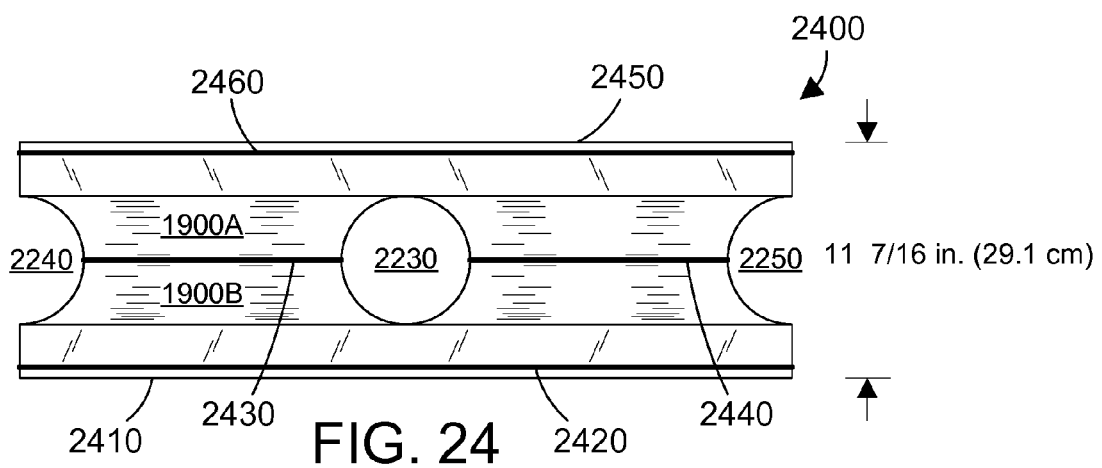
FIG. 24 shows a top view of a completed block formed from two half-block elements with two wooden attachment layers.

Two half-blocks may be attached together to make a complete block, as shown by the examples in FIGS. 22-24. FIG. 22 shows a completed block 2200 made from two half-blocks 1900A and 1900B with no wooden attachment layer. In this configuration, the two half blocks 1900A and 1900B are glued together at glue joints 2210 and 2220. Note that gluing the two half-blocks 1900A and 1900B together defines the central cylindrical channel 2230 and the two semi-cylindrical channels 2240 and 2250, similar to the channels described above with respect to FIG. 13. The preferred dimensions for the completed block are a length of 32 in. (81.3 cm), a thickness of 10$\frac{9}{16}$ in. (26.8 cm) and a height of 16 in. (40.6 cm) that is not shown in FIG. 22.

FIG. 23 shows a completed block 2300 made from two half-blocks 1900A and 1900B and a wooden sheet 2310, resulting in a completed block 2300 with a wooden attachment layer 2310. In this configuration, the half block 1900A is glued to the wooden sheet 2310 at glue joint 2320. The second half-block 1900B is then glued atop the half block 1900A, at glue joints 2330 and 2340. Note that gluing the two half-blocks 1900A and 1900B together defines the central cylindrical channel 2230 and the two semi-cylindrical channels 2240 and 2250. The preferred dimensions for the completed block are a length of 32 in. (81.3 cm), a thickness of 11 in. (27.9 cm) and a height of 16 in. (40.6 cm) that is not shown in FIG. 23.

FIG. 24 shows a completed block 2400 made from two half-blocks 1900A and 1900B and two wooden sheets 2410 and 2450, resulting in a completed block 2400 with two wooden attachment layers. In this configuration, the half block 1900BA is glued to a first wooden sheet 2410 at glue joint 2420. The second half-block 1900A is then glued atop the half block 1900B, at glue joints 2430 and 2440. The second wooden sheet 2450 is then glued to the half-block 1900A, as shown at glue joint 2460. Note that gluing the two half-blocks 1900A and 1900B together defines the central cylindrical channel 2230 and the two semi-cylindrical channels 2240 and 2250. The preferred dimensions for the completed block are a length of 32 in. (81.3 cm), a thickness of 11$\frac{7}{16}$ in. (29.1 cm) and a height of 16 in. (40.6 cm) that is not shown in FIG. 24.

Details are now provided regarding the molding process. Traditional CMU molds and processes are not suitable for the block mix disclosed herein that includes a substantial amount of compressible material, because the high levels of compression required for traditional CMUs would compress some of the compressible material, which would result in the compressed material attempting to expand as it leaves the mold, resulting in the block blowing or falling apart as it leaves the mold. To understand the significance of the new process for molding a partial block element or a complete block using a block mix that includes a substantial amount of compressible material using little to no compressive force, we need to first understand the prior art process for molding a CMU.

Figure 25:
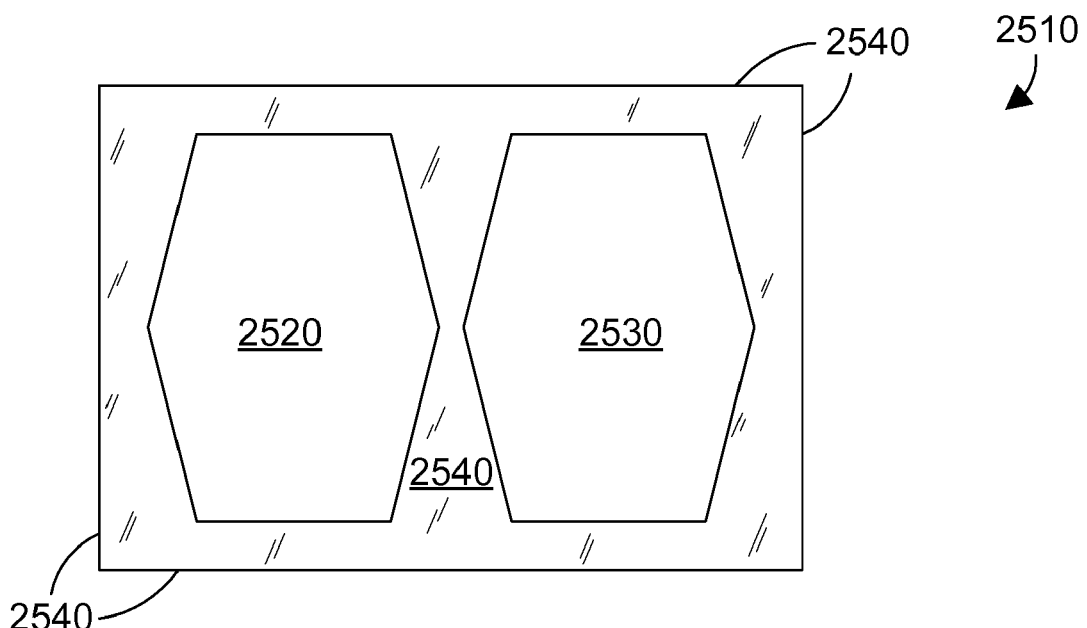
FIG. 25 is a top view of a prior art mold for forming landscape blocks.
Figure 26:
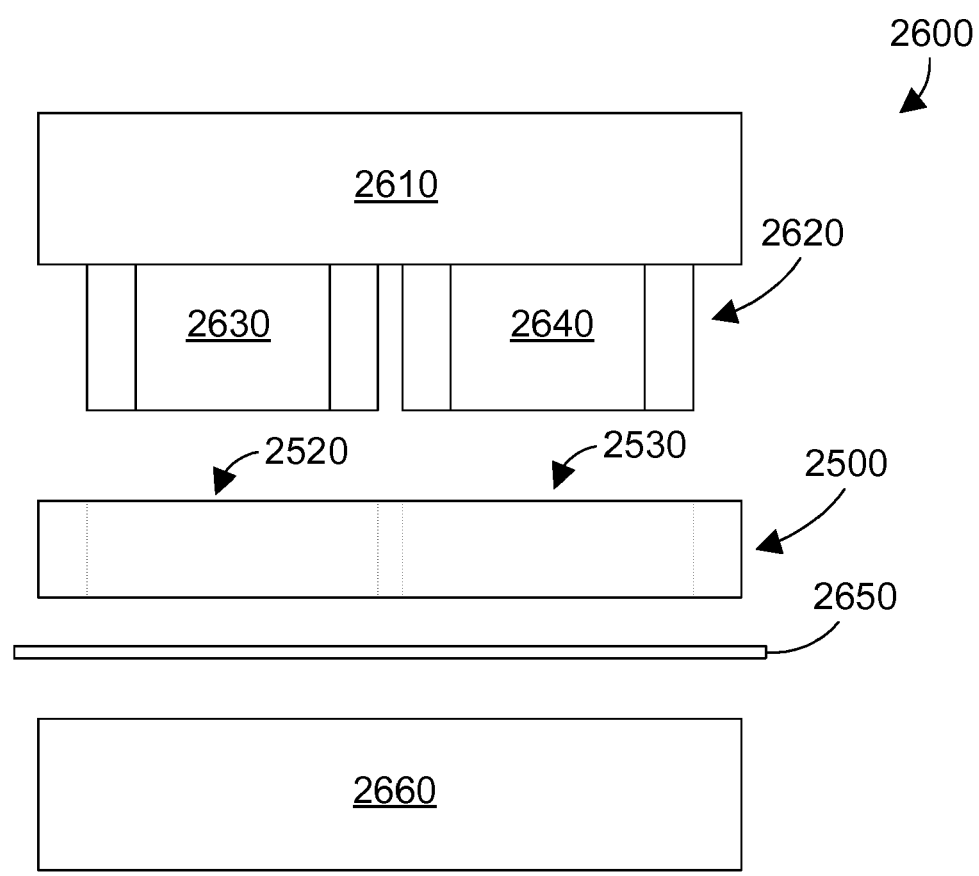
FIG. 26 is a side view showing the arrangement of the mold in FIG. 25 in a traditional CMU molding machine.

Referring to FIG. 25, a top view of a prior art mold 2510 for molding landscaping pavers is shown. Mold 2510 includes two openings 2520 and 2530 that are surrounded by side walls 2540. Note that openings 2520 and 2530 preferably extend the full depth of the mold. FIG. 26 shows a side view showing various components in a prior art CMU molding machine 2600. One suitable CMU molding machine is a Besser v312. The mold 2500 is fixedly attached to the molding machine so its position does not change with respect to the molding machine. A top plunger 2610 includes a head shoe assembly 2620 that has two protruding portions 2630 and 2640 that have shapes corresponding to the openings 2520 and 2530 in the mold 2500, and are just slightly smaller to allow the protruding portions 2530 and 2540 of the shoe assembly to pass through the full depth of the mold 2500 within the openings 2520 and 2530. A movable plate 2650 known in the art as a "pallet" forms the bottom of the mold, and is raised and lowed by a bottom plunger 2660. The top plunger 2610 and bottom plunger 2660 are moved up and down with respect to mold 2500 to form a CMU, as discussed in more detail below.

Figure 27:
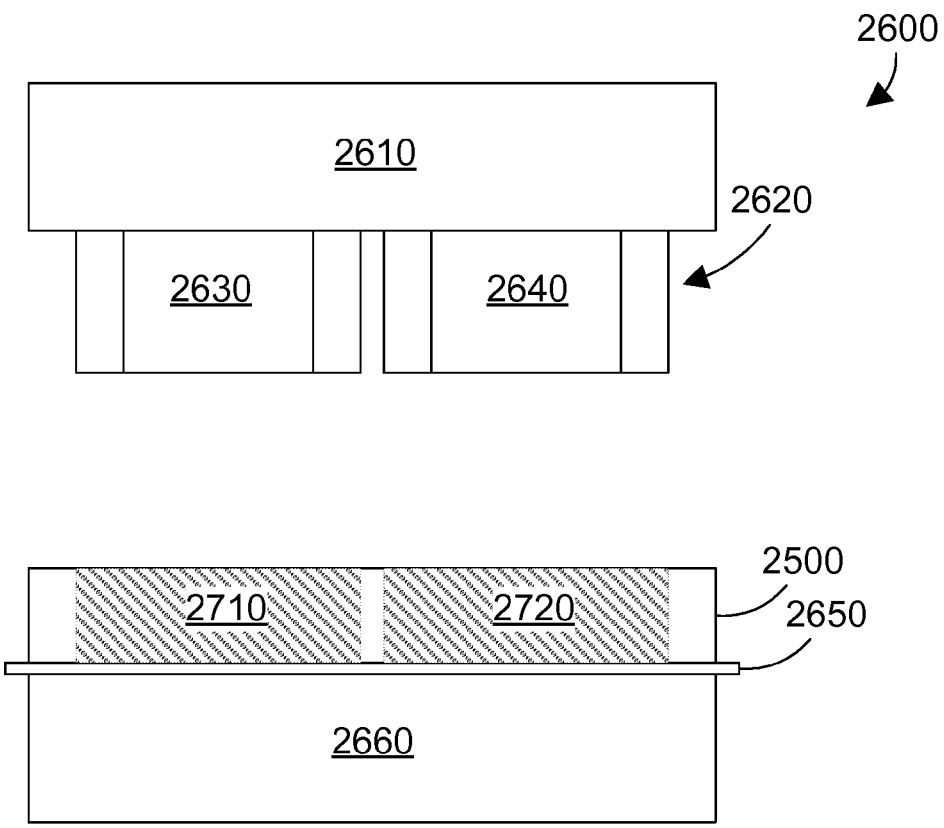
FIG. 27 shows the mold after being filled with a known concrete block mix.

FIG. 27 shows the CMU molding machine 2600 after the block mix has been poured into the mold, as shown by the hatched portions 2710 and 2720 in the mold 2500. The movable plate 2650 is moved by bottom plunger 2660 to contact the bottom of the mold 2500. The block mix is then poured into the mold 2500, then screeded off even with the top of the mold 2500. Many CMU molding machines have top hoppers that receive block mix from a belt-type conveyor, and have feed drawers that direct the block mix from the top hopper into the mold, then screed off the excess block mix to be even with the top of the mold. This process is well-known, and is therefore not discussed here in further detail. Once the block mix is in the mold, the top plunger 2160 moves down the protruding portions 2630 and 2640 of the head shoe assembly 2620 to contact the top of the block mix at 2710 and 2720, as shown by the small arrow in FIG. 28. Once contact is made, substantial pressure is applied to the block mix at 2710 and 2720 by the protruding portions 2630 and 2640 of the shoe assembly 2620 to compact or compress the block mix, as represented by the larger arrow in FIG. 28. The compaction of the block mix under high compressive force evenly distributes the block mix in the mold, and also hardens the block mix so the block will retain its shape after being ejected from the mold after only a few seconds of compression in the mold. After the block mix has been sufficiently compressed for a sufficient period of time, the top plunger 2610 pushes the head shoe assembly 2620 down at the same time the bottom plunger 2660 is moving the movable plate 2650 down, resulting in the blocks 2710 and 2720 being ejected from the mold 2500 as shown in FIG. 29. At this point the top plunger 2610 may move up to its original position shown in FIG. 27, the movable plate 2650 with the blocks 2710 and 2720 is typically conveyed away from the CMU molding machine 2600, and a new movable plate will be placed on the bottom plunger 2660, which will then move the movable plate to contact the bottom surface of the mold as shown in FIG. 27. At this point the cycle can repeat, forming and ejecting a block in a matter of seconds. A typical cycle time for a CMU molding machine is 12-15 seconds, but may be significantly faster or slower depending on the features and age of the CMU molding machine.

Figure 28:
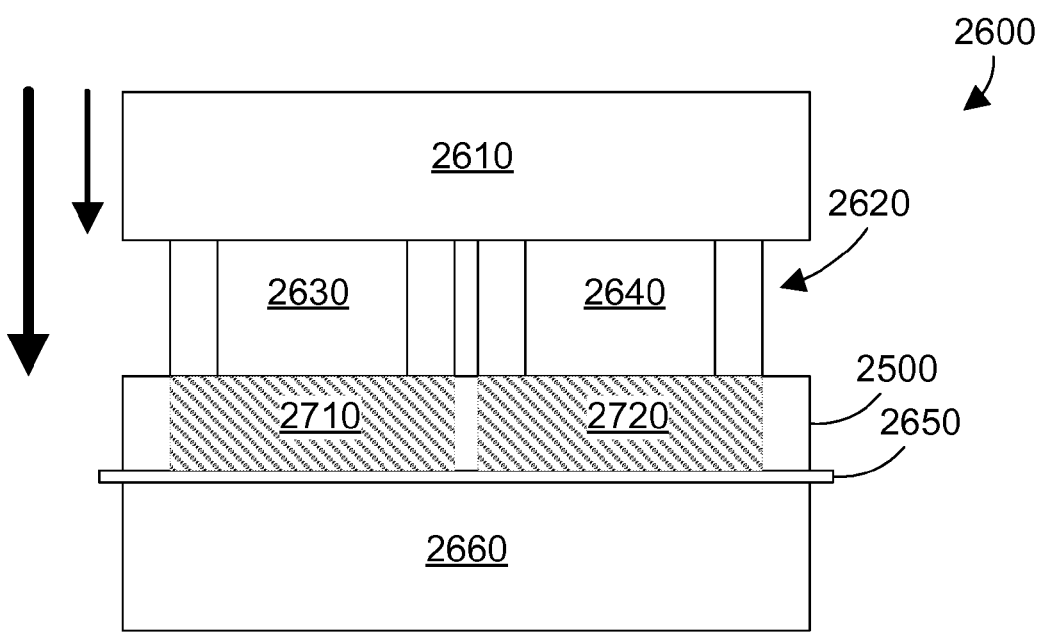
FIG. 28 shows the head shoe assembly compressing the concrete mix in the mold.
Figure 29:
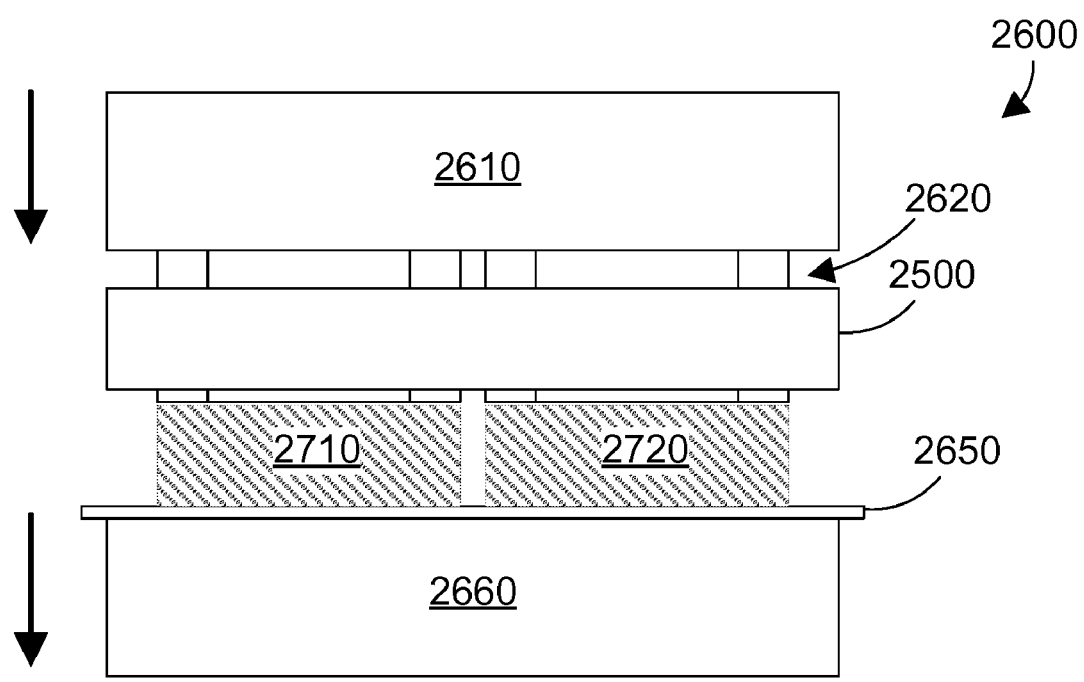
FIG. 29 shows how the blocks in the mold are ejected by the head shoe assembly moving downward as the movable plate that forms the bottom of the mold moves downward.

If a mix that includes a substantial amount of compressible material is used, the standard CMU mold and process above and shown in FIGS. 1 and 25-29 cannot be used. The high force of compression in step 140 in FIG. 1 as shown in FIG. 28 would compress the compressible material in the block mix, which can have two detrimental effects. The compressible material is typically very lightweight. The size of the particles of compressible material thus adds insulative value to the mix. If the compressible material is compressed to half its original size, it will only have about half of its original insulative value. Moreover, the degree to which the compressible material decompresses can cause a block to blow or fall apart as it exits the mold. For example, let's assume that EPS foam beads are used in a concrete block mix, as disclosed in the detailed formula and ranges given above. Let's further assume that under sufficient compressive force, the EPS foam beads will compress to half their original volume, and when the compressive force is removed, will regain half of the volume they shrank under compression. Thus, the EPS foam beads in the block mix will shrink to half their volume, then will expand until the EPS foam beads are 75% of their original size. The reduced final size reduces the insulative value of the foam beads, while the expansion of the compressed EPS foam beads will store energy that will cause the mix to expand as it exits the mold, which will likely cause the block to blow apart or fall apart due to the force of the EPS foam beads expanding as the block exits the mold.

Figure 30:
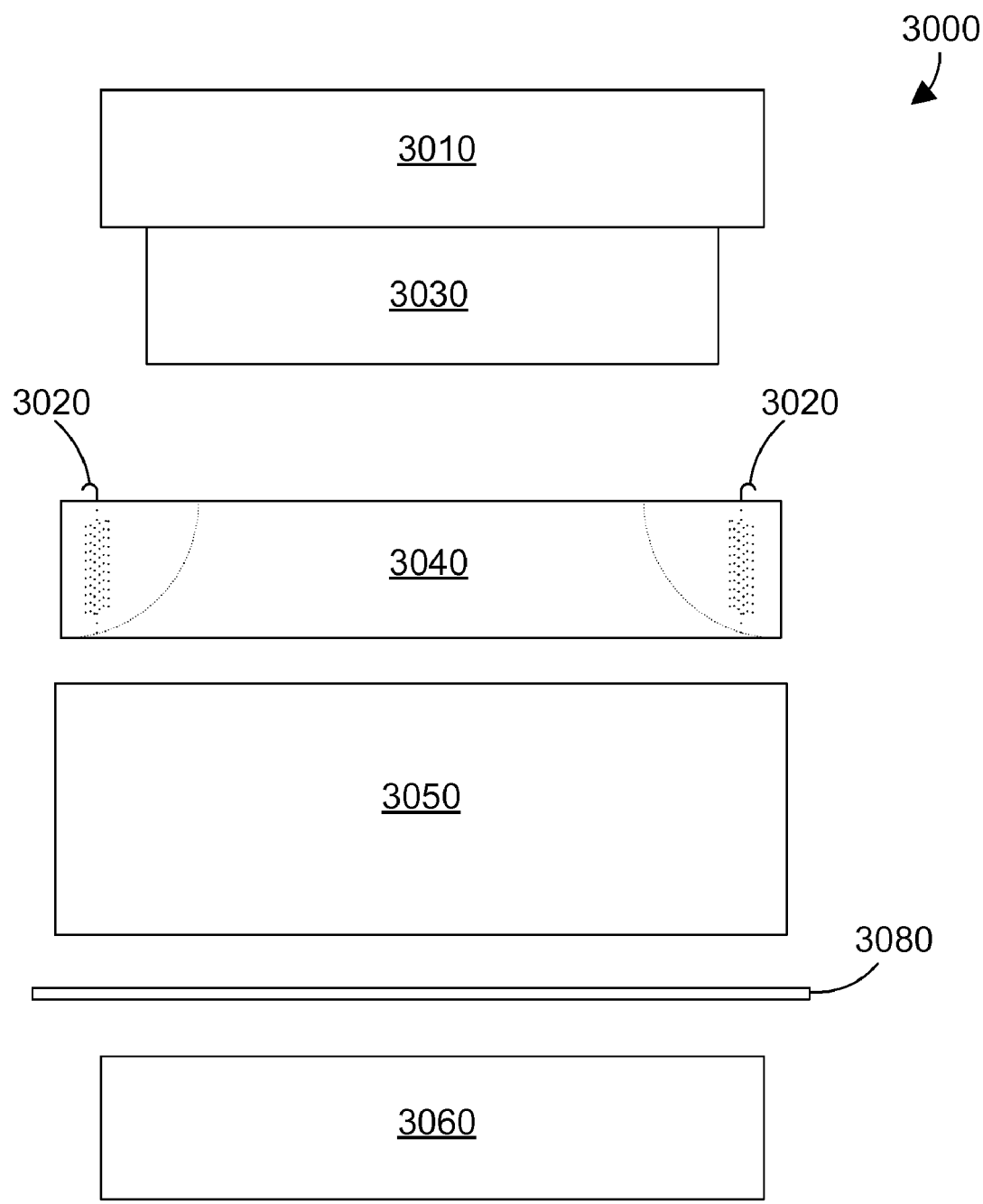
FIG. 30 is a side view showing the arrangement of a mold that allows forming blocks having a substantial amount of compressible material in a molding machine.

Referring to FIG. 30, a molding machine 3000 for molding a partial block element as disclosed herein includes an upper plunger 3010 and a lower plunger 3060. While the general function of these plungers, namely to travel up and down, is similar to the corresponding plungers 2610 and 2660 shown in FIGS. 26-29, the length of travel, amount of compression, and timing between the movements of the two are different than for plungers 2610 and 2660, as described in detail below. A head shoe assembly 3030 is coupled to the top plunger 3010. The mold comprises the mold core 3040 and the mold box 3050. Note that mold core 3040 includes a plurality of tension springs 3020. Mold core 3040 is one suitable implementation for mold core 700 shown in FIG. 7. A movable plate 2650 is used, and is moved up and down using the bottom plunger 3060.

Figure 31:
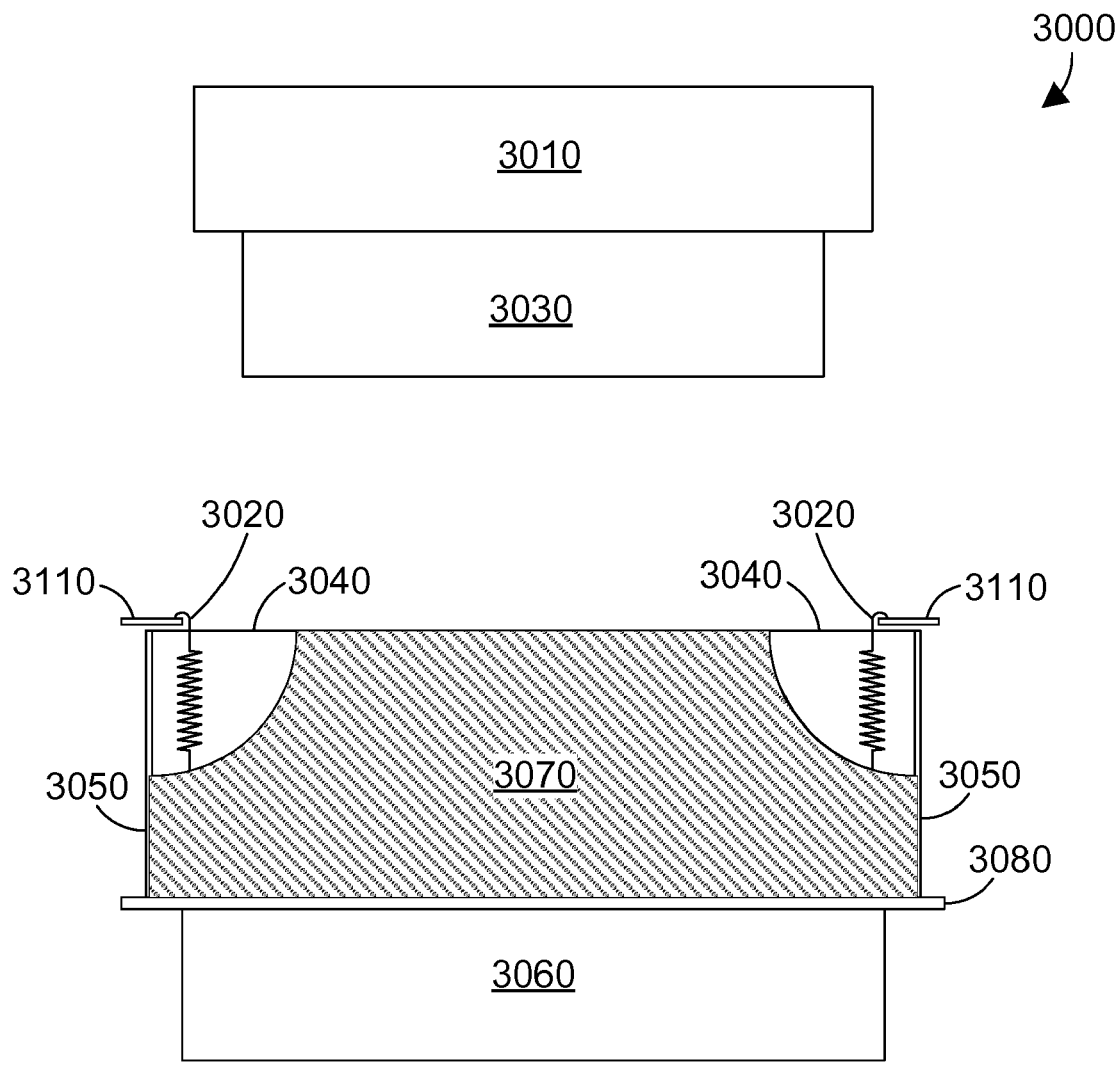
FIG. 31 shows the mold after being filled with block mix that includes a substantial amount of compressible material.
Figure 32:
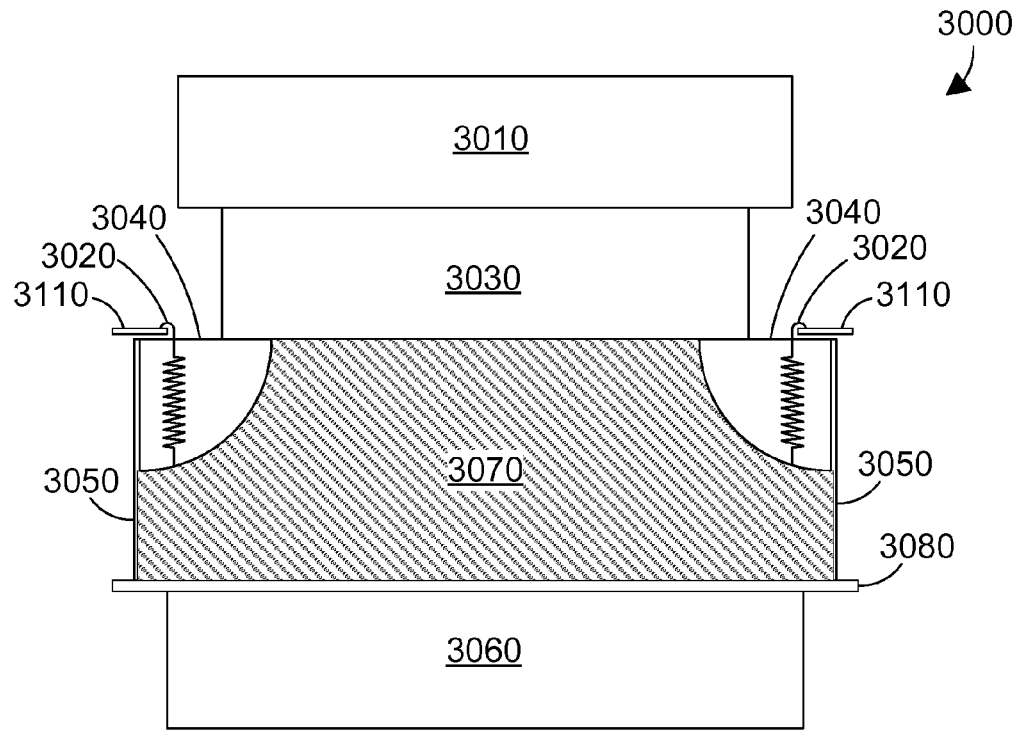
FIG. 32 shows the mold after the head shoe assembly is placed on top of the mold core.

We now look to FIG. 31, where the molding process is begun. Bottom plunger 3060 brings the movable plate 3080 up to contact the bottom of the mold box 3050 as shown, causing the movable plate 3080 to form the bottom of the mold. The tension springs 3020 are attached to spring brackets 3110 as shown, which suspends the mold core 3040 from the springs 3020. When the springs 3020 are not stretched (i.e., under insufficient tension to expand the springs), the top of the mold core 3040 is at the same level as the top of the mold box 3050. Note the mold box 3050 and mold core 3040 in FIGS. 31-34 are shown in cross-section to simplify the illustration of the function of molding machine 3000. With the movable plate 3080 held at the bottom of mold box 3050 by bottom plunger 3060, and with the top plunger 3010 and head shoe assembly 3030 out of the way, the mold is ready to fill with mix. FIG. 31 assumes the mix has already been poured into the mold, as shown by the hatched area 3070. This can be done using any suitable method, such as a using a top hopper and feed drawer as is common in the art. As the mix is poured into the mold, the mold is vibrated to consolidate and distribute the mix evenly in the mold. The top plunger 3010 and its head shoe assembly 3030 are then moved down on top of the block mix 3070. Head shoe assembly 3030 preferably contacts the top of the block mix, but does not provide any significant compressive force. In fact, the head shoe assembly 3030 is wider than the opening in the mold core 3040, which means the head shoe assembly 3030 simply moves down to rest on the side of the mold core 3040, preferably without stretching the tension springs 3020 while the block mix 3070 is vibrated again, as shown in FIG. 32.

Vibration with the head shoe assembly 3030 in place consolidates the block mix 3070 to the point of forming a partial block element. The head shoe assembly 3030 serves as the top to the mold. At this point the vibration stops so the block element may be ejected from the mold. In the most preferred implementation, the mold box is vibrated from the time the block mix is poured into the mold until just before the block element 3070 is ejected from the mold. Note, however, the vibration may start and stop several times as required. Thus, a first vibration could occur while the mix is being poured into the mold, the first vibration could stop while the feed drawer screeds off the mold, then a second vibration could start after the head shoe assembly 3030 is moved down to contact the mold core 3040, then stop before the block element is ejected from the mold. Any suitable number and timing of vibration of the mold is within the scope of the disclosure and claims herein.

Figure 33:
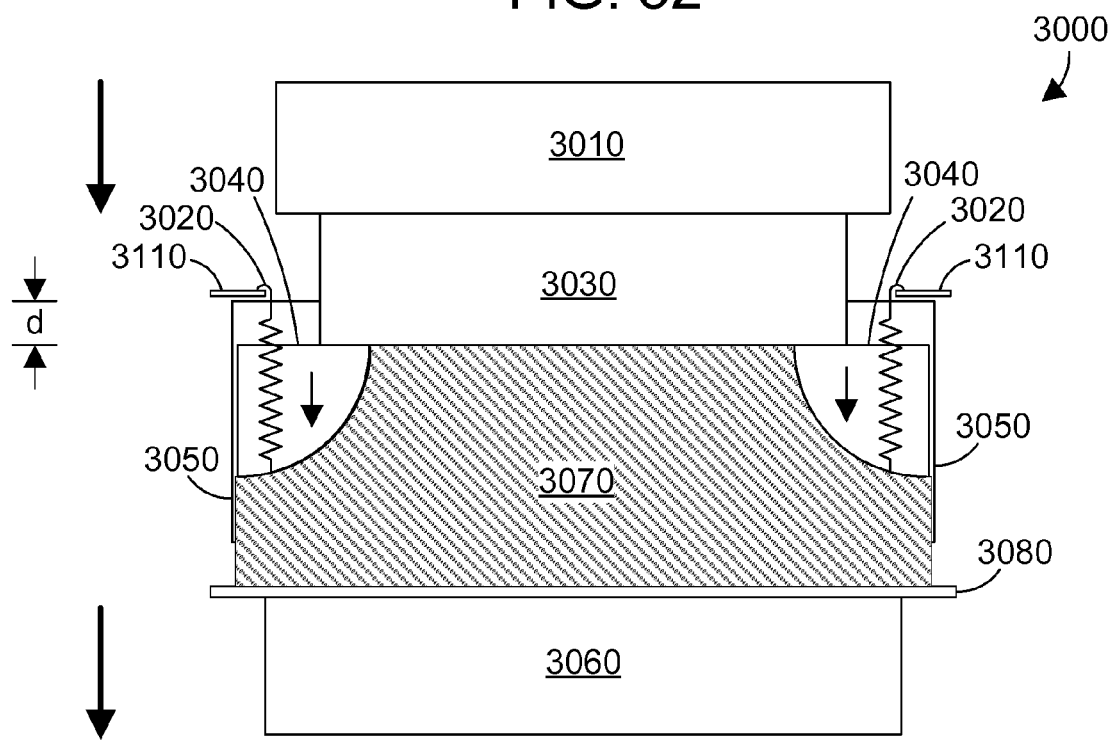
FIG. 33 shows the mold after the head shoe assembly moves downward, pressing the mold core downward a first distance.
Figure 34:
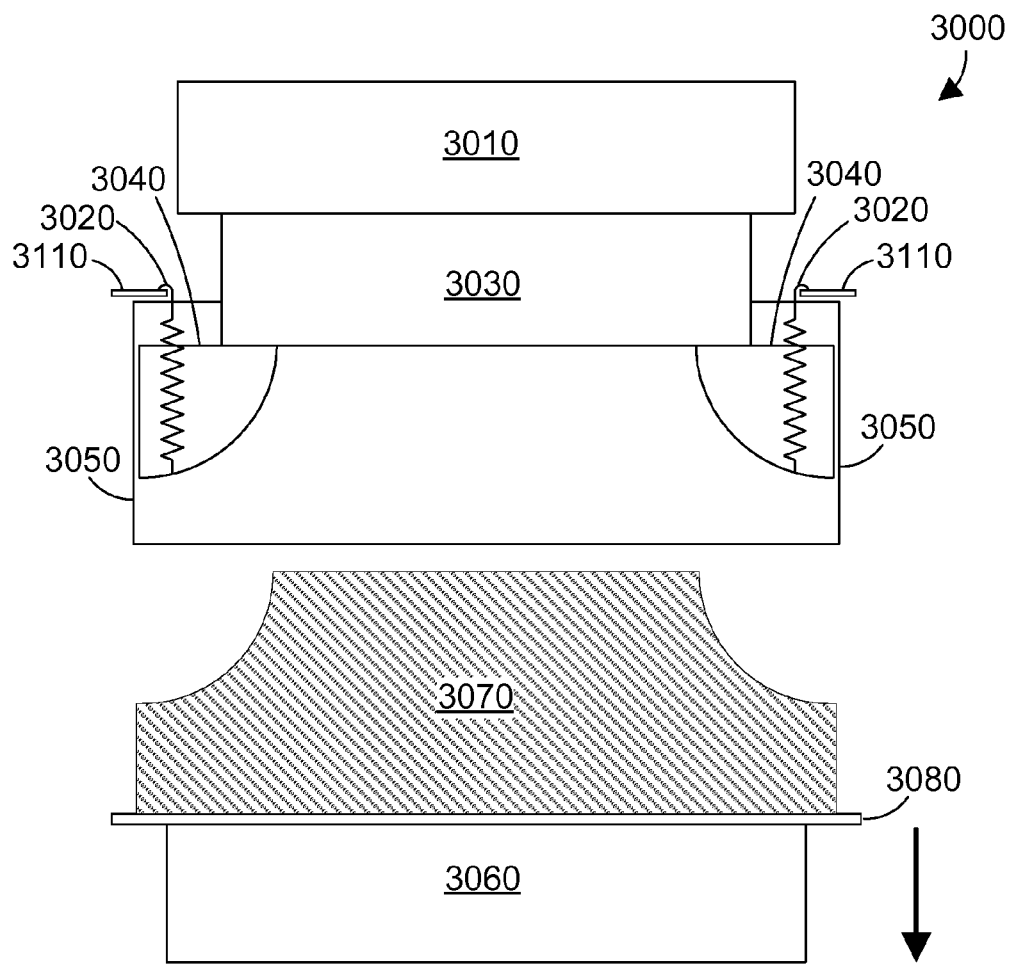
FIG. 34 shows the movable plate continuing its downward motion until the partial block element clears the mold.

To eject the block element from the mold, the top plunger 3010 moves down as shown in FIG. 33, which causes the mold core 3040 to move down, which makes the tension springs 3020 stretch. At the same time, the lower plunger 3060 moves the movable plate 3080 down at the same speed and time as the head shoe assembly 3030 moves the mold core 3040. The result of moving the mold core 3040 to tension the springs 3020 at the same time the movable plate 3080 is lowered is the adhesive forces between the formed block portion 3070 and the sides of the mold box 3050 are broken as the block mix 3070 begins to slide out of the mold box 3050. Note that top plunger 3010 and head shoe assembly 3030 move some defined first distance shown as "d" in FIG. 33. While the top plunger 3010 and head shoe assembly 3030 move distance "d" in FIG. 33, the lower plunger 3060 moves the lower plate 3080 the same distance. Thus, the only compressive force on the partial block element 3070 is the force caused by adhesion of the partial block element 3070 to the sides of the mold box 3050. With the movement of the mold core 3040 downward, the adhesive force between the molded partial block element 3070 and the sides of the mold box 3050 is broken. When the top plunger 3010 and head shoe assembly 3030 stop their travel after distance "d" has been traversed, thereby tensioning the tension springs 3020, the bottom plunger 3060 continues to move down, allowing the formed partial block element 3070 to continue moving downward out of the mold box 3050. This downward motion is continued until the partial block element 3070 is clear of the mold box 3050, as shown in FIG. 34. The partial block element 3070 may then be conveyed away from the molding machine 3000, while a new movable plate is positioned on the bottom plunger. Note when the top plunger 3010 and head shoe assembly 3030 move up, the tension on the tension springs 3020 will cause the mold core 3040 to return to its previous position at the top of the mold box 3050, at which point the tension springs 3020 are no longer stretched. At this point the cycle can continue, forming one of the partial block assemblies according to the cycle time of the molding machine. Tests on an existing Besser v312 molding machine shows a cycle time of 12-15 seconds may be achieved. Faster cycle times are possible using more modern molding machines.

Figure 35:
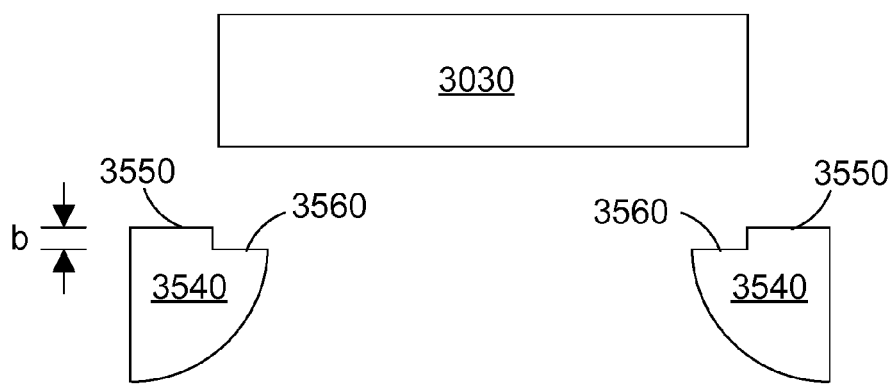
FIG. 35 shows an alternative design for the mold core that provides some compressive force on the block mix when the head shoe assembly 3030 is lowered onto the mold core.

In the most preferred implementation illustrated in FIGS. 30-34 and discussed in detail above, there is no or very little compressive force on the block mix because the block mix is screeded off at the top of the mold box, which coincides with the top of the mold core. As a result, when the head shoe assembly 3030 is moved down until in contacts the mold core, it imparts no to very little compressive force to the block mix. This is a significant difference when compared to prior art CMU block molding methods, which require a significant amount of compressive force to harden the block mix before the block mix is ejected from the mold. Note the amount of compressive force on the block mix could be adjusted within the scope of the disclosure and claims herein depending on the desired characteristics of the resulting partial block elements. For example, the height of the mold box could be a half inch (1.3 cm) deeper, and when the head shoe assembly 3030 is moved down to contact the mold core, instead of stopping when it contacts the mold core, it could instead push the mold core ½ in. (1.3 cm) into the mold box, thereby producing a half inch (1.3 cm) of compression of the block mix. In addition, the configuration of the mold core could include a step on the upper surface as shown in FIG. 35. Thus, when the block mix is screeded off by the feed drawer, the block mix will be even with the upper portion 3550, which is some distance "b" above the lower portion 3560. In this manner, when the head shoe assembly 3030 moves down to contact the mold core, it will move until it contacts the lower portion 3560 of the mold core, thereby providing compaction in the amount of distance "b". Yet another way to provide a compressive force on the block mix is to keep the movable plate 3080 stationary while the head shoe assembly 3030 moves the mold core 3040 down. This is a very simple way to provide an easily adjustable compressive force on the block mix during the ejection phase. For example, the movable plate 3080 could remain stationary while the head shoe assembly 3030 moves the mold core 3040 down 0.5 in. (1.3 cm), and could then move at a greater speed than the head shoe assembly 3030 to "catch up" with the head shoe assembly to relieve the compressive force on the block mix. Because the distance the mold core moves before the movable plate starts moving is adjustable, the compressive force on the block mix during the ejection phase may be easily adjusted.

In the most preferred implementations, even when a compressive force on the block mix is used, the amount of compressive force on the block mix is significantly less than the force required to mold traditional CMU blocks, which typically takes hundreds or thousands of pounds per square inch. The compressive force used to mold a partial block element is suitably 10 times less than the compressive force used to mold a traditional CMU, and is most preferably 100 times less than the same compressive force. In absolute terms, the amount of compressive force is suitably zero, preferably 1.5 lb per sq. in. (0.51 kg per sq. cm.) and may range from zero to 50 lbs per sq. in. (17 kg per sq. cm.). Due to the small compressive force on the block mix, the partial block elements may exit the mold with the help of the downward movement of the spring-loaded mold core without substantially deforming the block.

A variety of different tension springs may be used to couple the mold core to the spring brackets, depending on several factors, such as: depth of the mold core, weight of the core, number of springs used, maximum stretch of the springs (e.g., distance "d" in FIG. 33), and many other factors. For a quarter-block mold core with quarter-cylinder elements with a 3 in. (7.6 cm) radius, using four tension springs, with a maximum stretch "d" in FIG. 33 of 0.5 in. (1.3 cm), a suitable spring would be an extension spring part no. C-189 manufactured by Century Spring Corp., with an outside diameter of 0.625 in. (1.6 cm), a length of 3.25 in. (8.3 cm), with a wire diameter of 0.120 in. (0.3 cm), an initial tension of 32 lbs (14.5 kg), and a maximum deflection (or stretch) of 0.56 in. (1.4 cm). Of course, other springs could be used depending on the many factors discussed above.

Practical tests on an existing Besser v.312 molding machine shows that vibration of too high an intensity reduces the quality of the resulting partial block element. The best quality block elements are achieved using the lightest weights on the vibrator. Vibration is still needed, but light vibration seems to work much better than heavy vibration.

The compressive material used in the preferred block mix is expanded polystyrene (EPS) foam beads. While many different sized of EPS foam beads may be used within the scope of the disclosure and claims herein, the most preferred size for the EPS foam beads is from ⅛ in. (3.2 mm) to ⅜ in. (9.5 mm). Note that any suitable compressive material could be used within the scope of the disclosure and claims herein. As used in this disclosure and claims, the term "compressive material" means any substance that will compress at least ten percent of its volume under pressure, and will uncompress at least ten percent of the compressed volume when the compression force is removed. The preferred size for any compressive material is suitably from ⅛ in. (3.2 mm) to ⅜ in. (9.5 mm), the same preferred particle size for the EPS foam beads discussed above.

The method disclosed and claimed herein is useful when there is a substantial amount of compressive material in the block mix. As used herein, a block mix has a substantial amount of compressive material if the compressive material causes the block mix to compress more than ten percent when subjected to a compressive force of at least 50 lb. per sq. in. (17 kg per sq. cm).

While the method disclosed in the figures and discussed in the specification uses a known CMU machine to produce partial block elements using little to no compressive force, it is also within the scope of the disclosure and claims herein to form a full block as well. Forming a full bock is similar to prior art processes in terms of mold design and head shoe assembly design. However, the presence of a substantial amount of compressive material (such as EPS foam beads) requires very little compaction of the block mix in the mold. As a result, full blocks can also be formed as well.

The method disclosed herein allows forming a partial block element on a traditional CMU molding machine using very little compressive force. Multiple block elements may be glued together to form a completed block, which may include one or two wooden attachment layers.

One skilled in the art will appreciate that many variations are possible within the scope of the disclosure and claims herein. Thus, while the disclosure has been particularly described, it will be understood by those skilled in the art that these and other changes in form and details may be made therein without departing from the spirit and scope of the disclosure and claims herein. For example, while specific dimensions for the block elements are shown that will result in blocks having specific dimensions, the disclosure and claims herein expressly extend to any suitable size of block.

The invention claimed is:

1. A method for making a concrete block comprising the steps of:
   (A) mixing cement, water and compressive material in first proportions;
   (B) conveying the mixture in step (A) to a molding machine;
   (C) pouring the mix conveyed in step (B) into a mold comprising a mold box having an open bottom with a movable plate positioned at the bottom of the mold box, and a mold core having a plurality of tension springs that position a top of the mold core at a top of the mold box when the plurality of tension springs are not under tension, the mold core defining a plurality of regions in the mold box that will not receive the mix;
   (D) vibrating the mix in the mold to form a partial block element that has a shape defined by the mold box and the mold core; and
   (E) moving the movable plate downward while pushing downward on the mold core to stretch the plurality of tension springs a first distance, the movable plate continuing a downward movement after the mold core has traveled the first distance until the partial block element is clear from the mold box.

2. The method of claim 1 further comprising the steps of:
   (F) curing the partial block element; and
   (G) coupling together with adhesive a plurality of partial block elements to form a completed block.

3. The method of claim 2 wherein step (G) further comprises the step of coupling with adhesive a wooden attachment layer to at least one of the plurality of partial block elements.

4. The method of claim 3 wherein the wooden attachment layer comprises oriented strand board (OSB).

5. The method of claim 2 wherein each of the plurality of partial block elements defines a portion of a center cylindrical channel in the completed block and defines a portion of two semi-cylindrical channels in sides of the completed block.

6. The method of claim 1 wherein the compressive material comprises expanded polystyrene foam beads with a diameter from ⅛ inch (3.2 mm) to ⅜ inch (9.5 mm).

7. The method of claim 1 wherein the first proportions of cement, water, and compressive material comprise:
   310-330 lbs (141-150 kg) cement;
   17-20 gallons (64.4-75.7 liters) water; and
   35-40 cu, ft. (0.99-1.1 cu, meters) expanded polystyrene foam beads with a diameter from ⅛ inch (3.2 mm) to ⅜ inch (9.5 mm).

8. The method of claim 7 wherein step (A) further mixes into the cement, water and compressive material:
   8-24 fluid oz. (0.24-0.71 liters) acrylic fortifier; and
   16-20 fluid oz. (0.47-0.59 liters) water reducer.

9. The method of claim 1 further comprising the step of holding the mold box in a fixed position with respect to the movable plate and the mold core.

10. A method for making a concrete block comprising the steps of:
    (A) mixing cement, water and expanded polystyrene foam beads with a diameter from ⅛ inch (3.2 mm) to ⅜ inch (9.5 mm) in first proportions;
    (B) conveying the mixture in step (A) to a molding machine;
    (C) pouring the mix conveyed in step (B) into a mold comprising a mold box, a movable plate at the bottom of the mold box, and a mold core having a plurality of tension springs that position a top of the mold core at a top of the mold box when the plurality of tension springs are not under tension;
    (D) vibrating the mix in the mold to form a partial block element that has a shape defined by the mold box and the mold core;
    (E) moving the movable plate downward while pushing downward on the mold core to stretch the plurality of tension springs a first distance, the movable plate continuing a downward movement after the mold core has traveled the first distance, thereby ejecting the block element from the mold box;
    (F) curing the partial block element; and
    (G) coupling together with adhesive a plurality of partial block elements and coupling with adhesive a wooden sheet to at least one of the plurality of partial block elements to form a completed block having at least one surface substantially covered with a wooden attachment layer.

11. The method of claim 10 wherein each of the plurality of partial block elements defines a portion of a center cylindrical channel in the completed block and defines a portion of two semi-cylindrical channels in sides of the completed block.

12. The method of claim 10 wherein the first proportions of cement, water, and compressive material comprise:
    310-330 lbs (141-150 kg) cement;
    17-20 gallons (64.4-75.7 liters) water; and
    35-40 cu, ft. (0.99-1.1 cu, meters) expanded polystyrene foam beads with a diameter from ⅛ inch (3.2 mm) to ⅜ inch (9.5 mm).

13. The method of claim 10 wherein step (A) further mixes into the cement, water and compressive material:
    8-24 fluid oz. (0.24-0.71 liters) acrylic fortifier; and
    16-20 fluid oz. (0.47-0.59 liters) water reducer.

14. The method of claim 10 further comprising the step of holding the mold box in a fixed position with respect to the movable plate and the mold core.

15. A method for making a concrete block comprising the steps of:
    (A) forming a plurality of partial block elements that each comprise cement, water and expanded polystyrene (EPS) foam beads having a diameter from ⅛ inch (3.2 mm) to ⅜ inch (9.5 mm), each of the plurality of block element comprising an inner surface and an outer surface;
    (B) coupling together with adhesive the outer surface of a first at least one of the plurality of partial block elements to at least one wooden sheet; and
    (C) coupling together with adhesive the inner surface of the first at least one of the plurality of partial block elements to the inner surface of a second at least one of the plurality of partial block elements.

16. The method of claim 15 wherein steps (B) and (C) comprise the steps of:
    coupling with adhesive a first wooden sheet to the outer surface of a first of the plurality of partial block elements;
    coupling with adhesive the inner surface of the first of the plurality of block elements to the inner surface of a second of the plurality of block elements; and
    coupling with adhesive the outer surface of the second of the plurality of block elements to a second wooden sheet to form a completed block.

17. The method of claim 15 wherein each of the plurality of partial block elements defines a portion of a center cylindrical channel in the completed block and defines a portion of two semi-cylindrical channels in sides of the completed block.

18. The method of claim 15 wherein the first proportions of cement, water, and EPS foam beads comprise:
- 310-330 lbs (141-150 kg) cement;
- 17-20 gallons (64.4-75.7 liters) water; and
- 35-40 cu, ft. (0.99-1.1 cu, meters) EPS foam beads.

19. The method of claim 15 wherein steps (B) and (C) comprise coupling four quarter-block elements with adhesive to form a completed block.

20. The method of claim 15 wherein steps (B) and (C) comprise coupling two half-block elements with adhesive to form a completed block.

* * * * *